(12) United States Patent
Hiraide

(10) Patent No.: US 9,746,674 B2
(45) Date of Patent: Aug. 29, 2017

(54) OPTICAL MEMBER AND VIRTUAL IMAGE DISPLAY APPARATUS

(71) Applicant: Seiko Epson Corporation, Tokyo (JP)

(72) Inventor: Noriaki Hiraide, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 267 days.

(21) Appl. No.: 14/075,830

(22) Filed: Nov. 8, 2013

(65) Prior Publication Data

US 2014/0139403 A1    May 22, 2014

(30) Foreign Application Priority Data

Nov. 16, 2012 (JP) ................................ 2012-252008

(51) Int. Cl.
   *G02B 27/01* (2006.01)

(52) U.S. Cl.
   CPC ..... *G02B 27/0172* (2013.01); *G02B 27/0176* (2013.01); *G02B 2027/0178* (2013.01)

(58) Field of Classification Search
   CPC .......................... G02B 27/0172; G02B 27/0178
   See application file for complete search history.

(56) References Cited

U.S. PATENT DOCUMENTS

| | | | | |
|---|---|---|---|---|
| 5,515,116 A | * | 5/1996 | Bernheiser | G02C 1/02 351/124 |
| 5,526,068 A | * | 6/1996 | Markovitz | G02C 7/12 351/154 |
| 5,808,801 A | * | 9/1998 | Nakayama | G02B 27/0172 348/E5.143 |
| 5,861,995 A | * | 1/1999 | Togino | G02B 7/12 359/630 |
| 5,912,769 A | | 6/1999 | Iizuka et al. | |
| 6,049,429 A | | 4/2000 | Iizuka et al. | |
| 6,330,121 B1 | * | 12/2001 | Kobayashi | G02B 5/04 345/8 |
| 6,441,978 B1 | | 8/2002 | Kobayashi | |
| 2002/0041445 A1 | * | 4/2002 | Nishioka | G02B 1/06 359/627 |

(Continued)

FOREIGN PATENT DOCUMENTS

| | | |
|---|---|---|
| JP | 09-073005 A | 3/1997 |
| JP | 10-268114 A | 10/1998 |

(Continued)

*Primary Examiner* — Claire X Pappas
*Assistant Examiner* — Robert Stone
(74) *Attorney, Agent, or Firm* — ALG Intellectual Property, LLC

(57) ABSTRACT

According to a light guide device that is an optical member, since a protruding rib extending along a sideways end portion is provided, first and second surfaces including a first surface and other free-form surfaces can be aligned with another member that forms, for example, a virtual image display apparatus with high precision when the light guide device is assembled to the other member by using part of the protruding rib, which is provided separately from the first and second surfaces, as a reference, whereby an optical function of the light guide device in the virtual image display apparatus or any other apparatus can be ensured. Further, an optical main body provided with the first and second surfaces has a shape similar to that of glasses and hence has a good external appearance.

20 Claims, 10 Drawing Sheets

(56) References Cited

U.S. PATENT DOCUMENTS

| | | | |
|---|---|---|---|
| 2002/0105738 A1* | 8/2002 | Kobayashi | G02B 5/04 359/834 |
| 2003/0030597 A1* | 2/2003 | Geist | G02B 27/0172 345/8 |
| 2005/0174470 A1 | 8/2005 | Yamasaki | |
| 2005/0264502 A1* | 12/2005 | Sprague | G02B 5/10 345/84 |
| 2006/0132382 A1* | 6/2006 | Jannard | G02C 11/06 345/8 |
| 2006/0152618 A1 | 7/2006 | Yamasaki | |
| 2008/0186445 A1* | 8/2008 | Van Atta | G02C 1/04 351/103 |
| 2009/0128773 A1* | 5/2009 | Wang | G02C 9/02 351/57 |
| 2009/0190089 A1* | 7/2009 | Wang | G02C 1/04 351/106 |
| 2009/0257019 A1* | 10/2009 | DiChiara | G02C 1/04 351/106 |
| 2010/0149073 A1* | 6/2010 | Chaum | G02B 27/0093 345/8 |
| 2012/0120498 A1* | 5/2012 | Harrison | G02B 3/08 359/630 |
| 2012/0169989 A1* | 7/2012 | Lin | G02C 1/04 351/62 |
| 2012/0212399 A1* | 8/2012 | Border | G02B 27/017 345/8 |
| 2013/0222896 A1* | 8/2013 | Komatsu | G02B 17/0848 359/365 |
| 2013/0234915 A1* | 9/2013 | Takeda | G02B 27/0172 345/8 |
| 2013/0314303 A1* | 11/2013 | Osterhout | G06F 3/005 345/8 |
| 2014/0049833 A1* | 2/2014 | Totani | G02B 27/0172 359/633 |
| 2014/0139927 A1* | 5/2014 | Hiraide | G02B 27/0172 359/630 |

FOREIGN PATENT DOCUMENTS

| | | |
|---|---|---|
| JP | 11-099525 A | 4/1999 |
| JP | 11-149003 A | 6/1999 |
| JP | 2005-223749 | 8/2005 |
| JP | 2010-139589 A | 6/2010 |

* cited by examiner

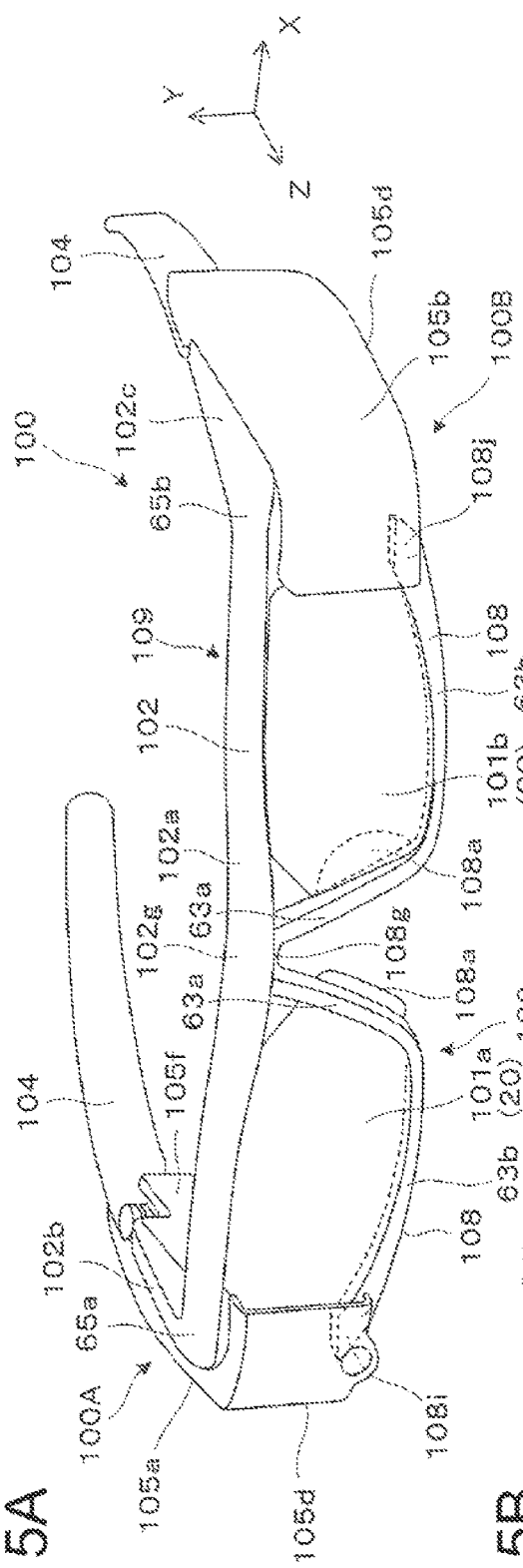
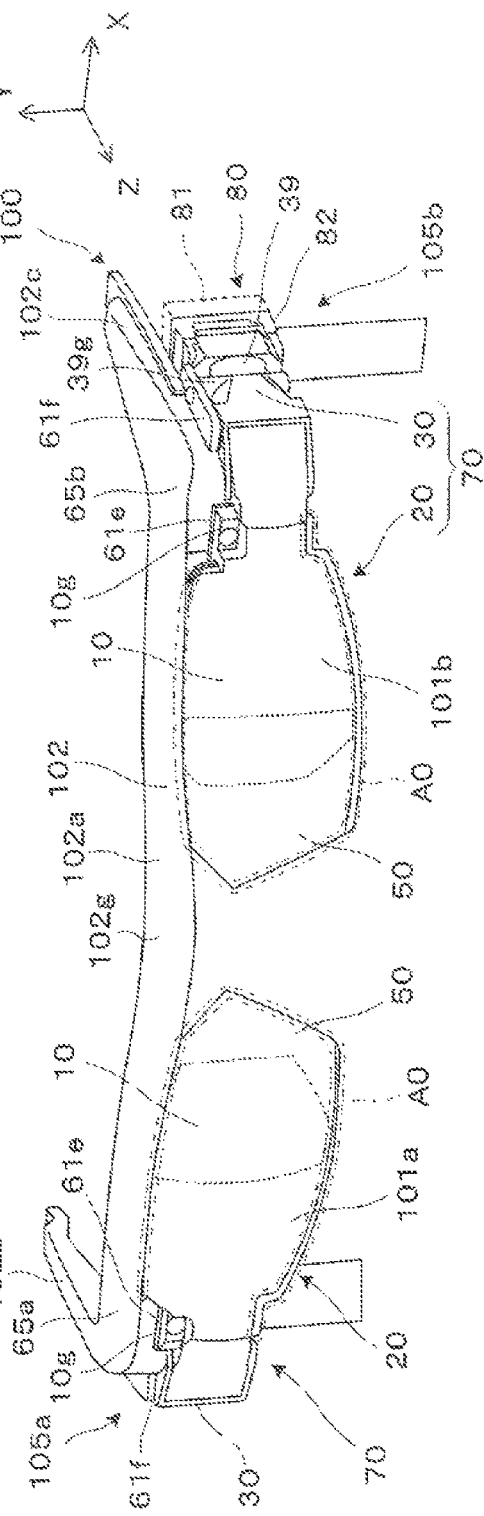
FIG. 5A
FIG. 5B

OPTICAL MEMBER AND VIRTUAL IMAGE DISPLAY APPARATUS

BACKGROUND

1. Technical Field

The present invention relates to a virtual image display apparatus that presents a viewer with video images in the form of virtual images, and particularly to an optical member suitable for a head-mounted display worn around the head of the viewer and a virtual image display apparatus using the optical member.

2. Related Art

A variety of optical systems incorporated in a virtual image display apparatus, such as a head-mounted display (hereinafter also referred to as HMD) worn around the head of a viewer, have been proposed. In particular, a variety of optical prisms used in front of the eyes have also been proposed (see JP-A-11-149003 and JP-A-10-268114, for example).

A virtual image display apparatus, such as an HMD, is desired to achieve further size and weight reduction and an increase in the angle of view without degradation in image quality. Further, when the entire view of the viewer is covered and only video image light is visible to the viewer, the viewer is unable to know what is going on outside and hence feels anxious. Instead, when the viewer is allowed to see the outside superimposed with video images, a new application, such as virtual reality, is created. It is therefore desired to develop a display that does not obstruct the outside view but displays it with video image light superimposed thereon.

In view of the circumstances described above, it is conceivable to configure a virtual image display apparatus based, for example, on a prism-shaped optical member having a plurality of free-form surfaces and so disposed in front of the viewer's eyes that see-through observation is achieved and guide video image light from an image display device to the viewer's eyes via the see-through-type optical member. In a virtual image display apparatus of this type, in particular, to improve comfort and appearance of the viewer who wears the virtual image display apparatus, it is typically desirable that the shape of the apparatus is similar to that of glasses. To make the shape of the virtual image display apparatus similar to that of glasses, among parts that form the virtual image display apparatus, the shape of a light guide portion disposed in front of each eye is particularly important.

On the other hand, it is also an important precondition that an optical member that forms the light guide portion has a light guiding function. When the optical member has a complicated shape, such as a shape including free-form surfaces, it is important to ensure assembly precision in order to maintain, for example, high-precision image quality.

SUMMARY

An advantage of some aspects of the invention is to provide not only an optical member that can be incorporated in a virtual image display apparatus, ensures a light guiding optical function, and has a shape similar to that of glasses so that a good appearance is achieved but also a virtual image display apparatus using the optical member.

A first optical member according to an aspect of the invention includes (a) a first surface and a second surface which face each other and each of which is formed of a free-form surface that directs light from a video image device toward a viewer's eye to allow the viewer to visually recognize an image, (b) a sideways end portion provided between the first surface and the second surface, and (c) a protruding rib provided along at least part of the sideways end portion.

Since the optical member described above includes a protruding rib extending along at least part of the sideways end portion, the first and second surfaces, each of which is formed of a free-form surface, can be aligned with another member that forms, for example, a virtual image display apparatus with high precision when the optical member is assembled to the other member by using part of the protruding rib, which is provided separately from the first and second surfaces, as a reference, whereby the optical function of the optical member in the virtual image display apparatus or any other apparatus can be ensured. Further, the shape of the optical main body provided with the first and second surfaces and forming an eye cover that covers an area in front of the eye can be similar to that of glasses and hence have a good external appearance.

In a specific aspect of the invention, the first and second surfaces of the first optical member described above reflect video images from the video image device and guide the video images to the viewer's eye.

In another aspect of the invention, each of the first and second surfaces is formed as a surface of a prism-shaped member and guides video image light from a video image display device that is the video image device to the viewer's eye while reflecting the video image light in the prism-shaped member.

In another aspect of the invention, the rib has an attachment portion that allows the first and second surfaces to be attached to a support frame that is a first another member with the first and second surfaces positioned relative to the support frame. In this case, a high-precision virtual image display apparatus can be readily manufactured by assembling the optical member, an image formation main body portion, and other components to the support frame as a base.

In another aspect of the invention, the attachment portion has a flat surface portion that comes into contact with a stopper surface provided on the frame when the first and second surfaces are attached to the frame and hence serves as a reference for fixing a relative attitude of the first and second surfaces. In this case, the flat surface portion provides good workability in the process of attaching the optical member to the frame.

In another aspect of the invention, the attachment portion is disposed outside an eye cover including one of the free-form surfaces, having an oval contour, and disposed in front of the eye. In this case, the thus configured attachment portion reliably prevents the exterior appearance of the virtual image display apparatus from being compromised. It is noted that the oval shape used herein includes an elliptical shape and a slightly deformed elliptical shape and is not limited to a shape formed only of smooth lines but includes a shape produced, for example, by combining several curved lines having different curvature values.

In another aspect of the invention, the rib, which is attached to the frame, limits displacement of the first and second surfaces relative to the other member. In this case, after the optical member is attached to the frame, the optical member will not be deformed or degraded due to an unexpected external force.

In another aspect of the invention, the optical member is produced by bonding a light guide prism to an auxiliary prism. The light guide prism is a main body that guides video image light and allows outside light to be recognized in see-through observation, and the auxiliary prism is bonded and integrally fixed to the light guide prism and assists the see-through observation capability of the light guide prism. In this case, the sight through the virtual image display apparatus can be a satisfactory one, and the degree of freedom of the exterior appearance of the virtual image display apparatus can be increased.

In another aspect of the invention, a half-silvered mirror layer is provided along the boundary between the light guide prism and the auxiliary prism. In this case, video image light and outside light can be simultaneously observed through the half-silvered mirror layer.

In another aspect of the invention, the light guide prism has a first bonding rib as part of the rib, the auxiliary prism has a second bonding rib as part of the rib, and the light guide prism and the auxiliary prism are bonded to each other by using the first bonding rib and the second bonding rib as a reference. In this case, the first bonding rib and the second bonding rib can be used to align the light guide prism and the auxiliary prism with each other with precision.

In another aspect of the invention, the light guide prism is formed in an injection molding process. In this case, the first and second surfaces, each of which is formed of a free-form surface, can be formed with high precision.

In another aspect of the invention, the rib has a flat plate section extending along the sideways end portion, and the flat plate section is formed along a parting line of a molding die used in the injection molding process. In this case, a high-precision rib can be readily manufactured. The flat plate section of the rib can serve, for example, as the first and second bonding ribs described above.

In another aspect of the invention, the rib has a gate portion associated with the flat plate section and corresponding to a port through which a resin used in the injection molding process flows in. In this case, the gate portion along with the rib can be hidden in the exterior appearance, whereby removal of or other measures against the gate portion can be simplified.

In another aspect of the invention, the optical member further includes a connecting surface disposed between the first surface and the flat plate section and inclined to a plane perpendicular to the flat plate section. In this case, the connecting surface provides a draft angle in the molding process, whereby the first and second surfaces can be transferred with increased precision in the molding process.

In another aspect of the invention, an inclined side surface that is adjacent to the rear-side second surface close to the wearer's face and forms an obtuse angle with respect to the second surface is provided. In this case, the portion of the optical member that is outside an effective optical path can be eliminated, whereby the weight of the optical member can be reduced, and the exterior appearance of the virtual image display apparatus to which the optical member is attached and the way the virtual image display apparatus is worn can be similar to those of glasses.

In another aspect of the invention, a tapered surface that includes the inclined side surface and extends along the face of the wearer who wears the optical member is provided between the first surface and the second surface. In this case, the optical member can be so optically designed that the distance to the wearer's eye is reduced.

In another aspect of the invention, the tapered surface has three flat surface portions corresponding to an upper edge of the eye socket, the cheek, and the nose as the inclined side surface. Each of the flat surface portions is not limited to a complete flat surface and includes a curved surface or a free-form surface having moderate curvature.

In another aspect of the invention, a connecting portion is provided to connect the optical member to an image formation main body portion that is second another member provided on the side where the video image light is incident, and the connecting portion allows relative alignment of the first and second surfaces with the second another member. In this case, the image formation main body portion and the optical member can be precisely aligned with each other, whereby the virtual image display apparatus can provide the wearer with intended video images.

In another aspect of the invention, the connecting portion is a fitting portion that fits into the image formation main body portion to allow alignment of the attitude of the optical member with the image formation main body portion. In this case, workability of fixing the image formation main body portion and the optical member to each other can be improved, whereby the virtual image display apparatus can provide the wearer with more precise, satisfactory video images.

In another aspect of the invention, the optical member further includes the following two components: a hard coat layer that is provided on the surfaces of the optical member to form at least the first and second surfaces; and a dripping liquid guide portion that controls the flow of a coat liquid when the hard coat layer is formed. In this case, the hard coat layer can suppress degradation of the first and second surfaces and make workability of formation of an immersion-type hard coat layer satisfactory for reduction in coating unevenness.

In another aspect of the invention, the dripping liquid guide portion is formed at the end facing away from the root side of the optical member on which video image light is incident. In this case, the optical member is so suspended that the end at which the dripping liquid guide portion is formed is the lower end, whereby the optical member can be immersed into and lifted up from a hard coating liquid tank and the degree of coating unevenness can be reduced.

A second optical member according to an aspect of the invention includes (a) a first surface and a second surface which face each other and each of which is formed of a free-form surface that directs light from a video image device toward a viewer's eye to allow the viewer to visually recognize an image, and (b) each of the first and second surfaces is formed of a curved surface having an oval contour.

In the optical member described above, since each of the first and second surfaces is formed of a curved surface having an oval contour, an optical main body provided with the first and second surfaces has a shape similar to that of glasses and hence has a good exterior appearance.

In a specific aspect of the invention, an eye cover including one of the curved surfaces having an oval contour and disposed in front of the eye has a drop-shaped external appearance. In this case, the eye cover as the optical main body has a shape more similar to that of glasses.

Another light guide device according to an aspect of the invention includes (a) a first surface and a second surface which face each other and each of which is formed of a free-form surface that directs light from a video image device toward a viewer's eye to allow the viewer to visually recognize an image, and (b) a tapered surface provided between the first surface and the second surface, forming an obtuse angle with respect to the second surface, and extending along the face of the wearer who wears the light guide device.

In the light guide device described above, since the tapered surface provided between the first surface and the second surface forms an obtuse angle with respect to the second surface and extends along the face of the wearer who wears the light guide device, the light guide device can be so optically designed that the distance to the wearer's eye is reduced. As a result, an optical main body provided with the first and second surfaces has a shape similar to that of glasses and hence has a good exterior appearance. Providing the tapered surface also allows the portion of the light guide device that is outside an effective optical path to be eliminated, whereby the weight of the light guide device can be reduced.

In a specific aspect of the invention, each of the first and second surfaces of the light guide device described above is formed of a curved surface having an oval contour. In this case, the tapered surface can be more readily formed.

In another aspect of the invention, the light guide device includes a protruding rib extending along at least part of a sideways end portion provided between the first surface and the tapered surface. In this case, the first and second surfaces can be aligned with another member that forms, for example, a virtual image display apparatus with high precision when the light guide device is assembled to the other member by using part of the protruding rib, which is provided separately from the first and second surfaces, as a reference, whereby the optical function of the light guide device in the virtual image display apparatus or any other apparatus can be ensured.

A virtual image display apparatus according to an aspect of the invention includes a video image device that produces video image light and any of the optical members described above, which directs the video image light from the video image device toward a viewer's eye to allow the viewer to visually recognize an image.

The virtual image display apparatus described above, which uses the optical member described above, is provided with the optical function thereof and has a shape similar to that of glasses and hence has a good exterior appearance.

In a specific aspect of the invention, the virtual image display apparatus further includes a frame that supports the video image device and the optical member in such a way that the optical member is disposed in front of the viewer's eye. In this case, using the optical member described above allows the optical member to be reliably fixed to the video image display device via the frame while precisely maintaining the relative positional relationship therebetween.

BRIEF DESCRIPTION OF THE DRAWINGS

The invention will be described with reference to the accompanying drawings, wherein like numbers reference like elements.

FIG. 5A is a perspective view showing the entire virtual image display apparatus, and FIG. 5B is a perspective view showing an internal structure with an exterior member and a protector removed from the virtual image display apparatus.

DESCRIPTION OF EXEMPLARY EMBODIMENTS

First Embodiment

A light guide device that is an optical member according to a first embodiment of the invention and other components will be described below in detail with reference to the drawings.

Figure 1A:
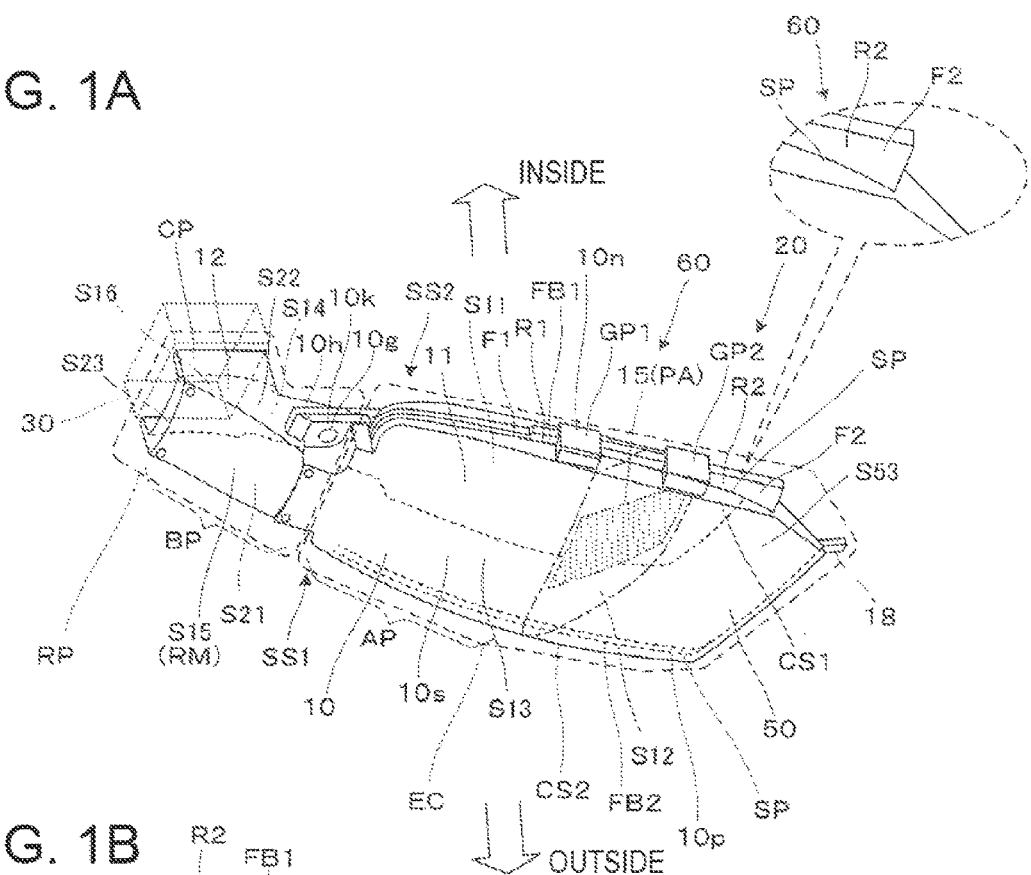
FIG. 1A is a perspective view for describing the exterior appearance and structure of a light guide device (optical member) according to a first embodiment.
Figure 1B:
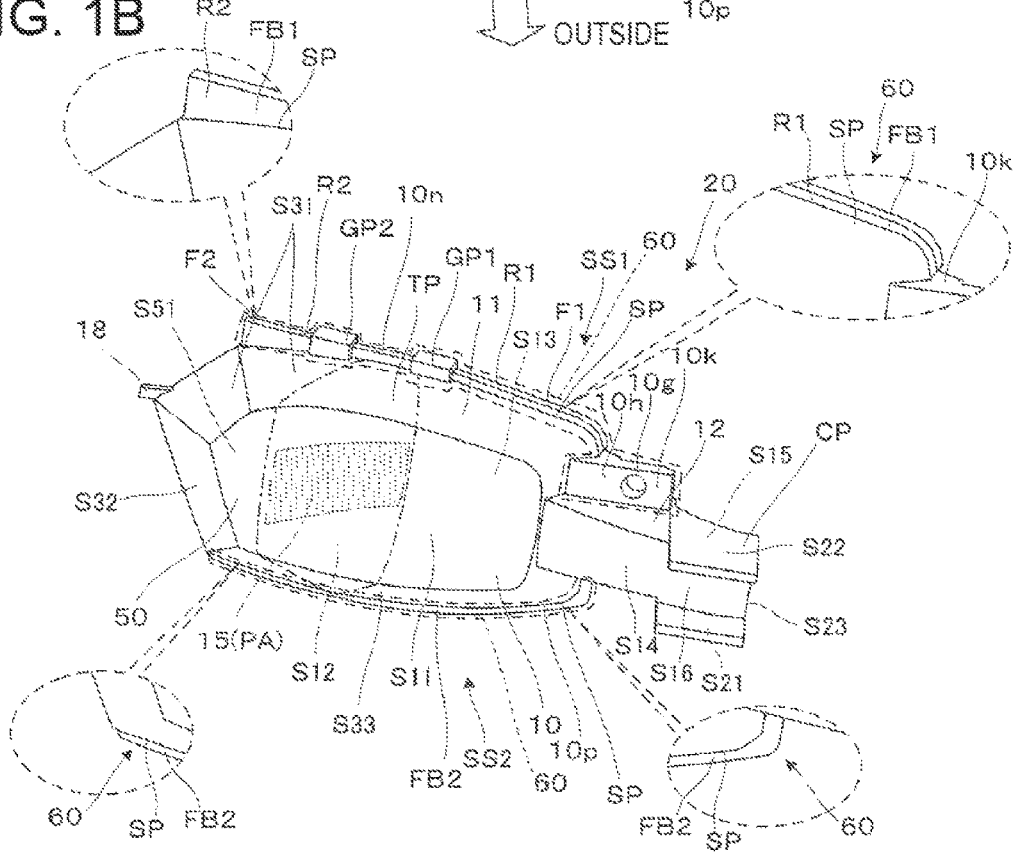
FIG. 1B is a perspective view of the light guide device viewed in a direction different from the viewing direction in FIG. 1A.

A light guide device 20 shown in FIGS. 1A and 1B is an integrated optical member including a light guide prism 10, which is disposed on the side where a projection lens 30 (see FIG. 1A), which is another member involved in image formation or an image formation main body portion, is present, and an auxiliary prism 50, which is a light transmissive member disposed on the opposite side of the light guide prism 10 to the projection lens 30, and formed by bonding the light guide prism 10 and the auxiliary prism 50 to each other. In the light guide device 20, the light guide prism 10 guides video image light having passed through the projection lens 30 and outputs the video image light through an inner surface facing the wearer's eye or face, and the light guide prism 10 and the auxiliary prism 50 transmit outside light through the inner surface facing the wearer's eye.

The light guide device 20 is a member made of a resin and having a three-dimensional shape curved in a complicated manner and includes, from the viewpoint of exterior appearance, an eye cover portion EC, which is a drop-shaped, flat ellipsoidal portion that covers an area in front of the viewer's eye, and a polyhedron-shaped root portion RP, which is an elongated portion extending from the eye cover portion EC. The light guide device 20 has a first surface SS1, which is a surface that performs an optical function and covers an area in front of the eye to form the exterior appearance of the light guide device 20, and a second surface SS2, which is a rear-side or inner-side surface close to the wearer's face.

A sideways end portion SP, which forms the contour of the light guide device 20 in a front view, is provided between the first surface SS1 and the second surface SS2, and a protruding rib 60 is provided along part of the sideways end portion SP, as shown in partial enlarged views in FIGS. 1A and 1B. Although described in detail later, the rib 60 is disposed, for example, in correspondence with the upper and lower edges of the light guide device 20 in a front view, as the extent of the rib 60 is indicated by the broken lines in FIG. 1B, and the rib along the upper edge, in particular, is divided into a bonding rib 10n and a frame attaching rib 10k.

In the light guide device 20, the light guide prism 10 has an eye front forming portion AP, a coupling portion BP, and a connecting portion CP. The eye front forming portion AP is a swollen portion of the light guide prism 10 and covers an area in front of the eye as part of the eye cover portion EC, and the eye front forming portion AP and the auxiliary prism 50 form an oval-contour surface portion of each of the first surface SS1 and the second surface SS2. The coupling portion BP forms part of the light guide prism 10 on the side where the root portion RP is present and has the frame attaching rib 10k, which is part of the rib 60 and allows attachment of the light guide device 20 to another member or a frame. The connecting portion CP is a member that is disposed on the side where the root portion RP, on which video image light is incident, is present and connects the light guide device 20 to the projection lens 30. That is, the connecting portion CP is not only a member that allows relative alignment of the first and second surfaces SS1, SS2 with the projection lens 30 but also a fitting portion that allows alignment of the attitude of the surfaces with the projection lens 30 by using fitting-based engagement.

Further, in the light guide device 20, the auxiliary prism 50 has a rod-shaped dripping liquid guide portion 18 at the end facing away from the root portion PR, on which video image light is incident. The function of the dripping liquid guide portion 18 will be described later in detail with reference to FIG. 3.

A description will next be made of a portion of the light guide device 20 that relates to an optical function of guiding video image light. The light guide prism 10 is a member made of a resin and integrally formed in an injection molding process, and can be functionally divided into a first prism portion 11 on the light exiting side remote from a video image display device (not shown) and a second prism portion 12 on the light incident side closer to the video image display device (not shown).

The first prism portion 11 has a first surface S11, a second surface S12, and a third surface S13 as surfaces having optical functions, and the second prism portion 12 has a fourth surface S14, a fifth surface S15, and a sixth surface S16 as surfaces having optical functions. The surfaces are arranged as follows: The first surface S11 and the fourth surface S14 are adjacent to each other; the third surface S13 and the fifth surface S15 are adjacent to each other; the second surface S12 is disposed between the first surface S11 and the third surface S13; and the sixth surface S16 is disposed between the fourth surface S14 and the fifth surface S15.

In the light guide prism 10, each of the first surface S11, the second surface S12, the third surface S13, the fourth surface S14, the fifth surface S15, and the sixth surface S16 is a free-form surface and involved in image formation.

A brief description will next be made of an optical path along which the light guide device 20 guides light. Video image light having passed through the projection lens 30, which is another member, is first incident on the sixth surface S16 of the second prism portion 12 of the light guide prism 10, reflected off the fifth surface S15, and further reflected off the fourth surface S14. The video image light is then incident on and totally reflected off the third surface S13 of the first prism portion 11 and incident on and totally reflected off the first surface S11. The video image light totally reflected off the first surface S11 is incident on and partially reflected off the second surface S12 and is incident again on and passes through the first surface S11. Although will be described later in detail, the second surface S12 has a half-silvered mirror layer 15, which is provided to allow see-through observation, and hence partially transmits and reflects the video image light. The video image light having passed through the first surface S11 allows a viewer to observe the images. Further, each of the first surface S11 and the third surface S13 is disposed in front of an eye EY and has a concave shape toward the viewer, whereby the diopter is substantially zero when the viewer observes outside light having passed through the first surface S11 and the third surface S13.

A description will next be made of the connecting portion CP associated with the light guide prism 10 and disposed on the side closest to the projection lens 30. The connecting portion CP is a protruding member provided in association with the root portion RP or the second prism portion 12 of the light guide prism 10 and has a first attachment reference surface S21 and a second attachment reference surface S22 extending from the upper and lower ends of the sixth surface S16 respectively toward the projection lens 30 to be connected. The connecting portion CP further has a third attachment reference surface S23 sandwiched between the first attachment reference surface S21 and the second attachment reference surface S22. Among the first to third attachment reference surfaces S21 to S23, the first attachment reference surface S21 and the second attachment reference surface S22 are flat surfaces disposed in parallel to each other, and the third attachment reference surface S23 is a flat surface disposed perpendicularly to the first and second attachment reference surfaces S21, S22. Having the first to third attachment reference surfaces (flat surfaces) S21 to S23, the connecting portion CP can be used to align the light guide prism 10 with the projection lens 30, which is another member, when the two members are connected to each other.

The auxiliary prism 50 is fixed to and integrated with the light guide prism 10 to form the light guide device 20, which is a single optical part. The auxiliary prism 50 is not only a prism that assists the see-through function of the light guide prism 10 but also a light transmissive member having a first transmissive surface S51, a second transmissive surface S52, and a third transmissive surface S53 as side surfaces having optical functions. The second transmissive surface S52 is disposed between the first transmissive surface S51 and the third transmissive surface S53. The first transmissive surface S51 is a curved surface that is an extension of the first surface S11 of the light guide prism 10. The second transmissive surface S52 is bonded to and integrated with the second surface S12 via an adhesive layer CC. The third transmissive surface S53 is a curved surface that is an extension of the third surface S13 of the light guide prism 10. The second transmissive surface S52 and the second surface S12 of the light guide prism 10, which are bonded to and integrated with each other, have shapes having substantially the same curvature. In this case, the diopter is maintained at substantially zero when the viewer observes outside light through the first transmissive surface S51 and the third transmissive surface S53, which are extensions of the first surface S11 and the third surface S13, respectively. It is noted that the third surface S13 and the third transmissive surface S53 form an oval contour surface of the first surface SS1 in front of the eye, and that the first surface S11 and the first transmissive surface S51 form an oval contour surface of the second surface SS2 in front of the eye.

The auxiliary prism 50 shows high light transmittance in the visible region, and a main body of the auxiliary prism 50 is made of a thermoplastic resin material having a refractive index substantially equal to that of a prism main body 10s of the light guide prism 10. The auxiliary prism 50 is formed by bonding the main body thereof to the prism main body 10s of the light guide prism 10 and then forming a hard coat film on the prism main body 10s and the main body of the auxiliary prism 50 bonded thereto. That is, the auxiliary prism 50 is formed of the main body with a hard coat layer 27 provided thereon, as the light guide prism 10 is.

In the light guide prism 10, the second surface S12, to which the auxiliary prism 50 is bonded, has a configuration using a half-silvered mirror in order to allow see-through observation. Specifically, the second surface S12 is a surface of the light guide prism 10, and the half-silvered mirror layer 15 is associated with the surface. The half-silvered mirror layer 15 is a light reflective film RM that transmits light (that is, semi-transmissive/semi-reflective film). The half-silvered mirror layer (semi-transmissive/semi-reflective film) 15 is formed on a partial area PA, which is part of the second surface S12. The half-silvered mirror layer 15 is formed by forming a metal reflective film or a dielectric multilayer film, and the reflectance of the half-silvered mirror layer 15 at which video image light GL is reflected ranges from 10% or higher but 50% or lower over an expected range of the angle of incidence of the video image light GL in a viewpoint of readily allowing see-through observation of outside light having passed through the auxiliary prism 50. The reflectance and transmittance of the half-silvered mirror layer 15 in a specific example at which the video image light GL is reflected and transmitted are set, for example, at 20% and 80%, respectively.

A description will next be made of the rib 60 provided over substantially the entire circumference of the light guide device 20. The rib 60 is a member made of a resin, provided as part of and in association with the light guide prism 10 and the auxiliary prism 50, and surrounding the circumferential edge of the light guide device 20. The rib 60 has the frame attaching rib 10k, which has an attachment portion 10g, which allows attachment of the light guide device 20 to a frame that is another member in the assembly of the virtual image display apparatus, and bonding ribs 10n and 10p, which are formed along the upper and lower edges of the light guide device 20 respectively, extend along the first surface SS1 and the second surface SS2, and serve as positioning references when the light guide prism 10 and the auxiliary prism 50 are bonded to each other. In the description, the bonding rib 10n is the upper-end-side bonding rib, and the bonding rib 10p is the lower-end-side bonding rib.

The attachment portion 10g of the frame attaching rib 10k is disposed outside the eye cover portion EC and has a flat surface portion 10h, which comes into contact with a stopper surface provided on the frame (not shown) described above when the light guide device 20 is attached to the frame and hence serves as a reference for fixing a relative attitude of the light guide device 20. The flat surface portion 10h provides good workability in the process of attaching the light guide device 20 to the frame described above.

The upper-end-side bonding rib 10n, which is one of the bonding ribs 10n and 10p described above, has a flat plate section FB1 having a flat-plate-like shape. Similarly, the lower-end-side bonding rib 10p has a flat plate section FB2. The flat plate sections FB1 and FB2, which will be described later in detail, serve as a positioning reference when the light guide prism 10 and the auxiliary prism 50 are bonded to each other. In particular, the upper-end-side bonding rib 10n, which includes the flat plate section FB1, also functions as a portion that limits displacement of the light guide device 20 relative to the frame (not shown) described above when attached to the frame or inserted and fit into the frame with a play or a slight gap between the bonding rib 10n and a groove-shaped limiting portion provided as a stopper in the frame. Further, the upper-end-side bonding rib 10n has gate portions GP1 and GP2 formed in association with the flat plate section FB1. The gate portions GP1 and GP2 correspond to ports through which a resin flows in when the light guide prism 10 and the auxiliary prism 50 are formed in injection molding processes, respectively. Each of the gate portions GP1 and GP2 is a block-shaped portion thicker than the flat plate section FB1, as shown in FIGS. 1A and 1B.

A tapered surface TP, which is so formed that it surrounds the entire first surface S11, which is part of the second surface SS2, is provided between the first surface SS1 and the second surface SS2 as well as the sideways end portion SP where the rib 60 is provided, as shown in FIG. 1B. The tapered surface TP is formed of a surface inclined by an obtuse angle with respect to the first surface S11 and includes an inclined side surface extending along part of the face of the wearer who wears the apparatus. The light guide device 20 can therefore be so optically designed that the distance to the wearer's eye is reduced. More specifically, the tapered surface TP has three flat surface portions S31, S32, and S33 as the inclined side surface, which correspond to the upper edge of the eye socket, the cheek, and the nose. It is noted that each of the flat surface portions S31, S32, and S33 is formed of a curved surface or a free-from surface having mild curvature as appropriate in accordance with the shape of the contour of each portion (upper edge of eye socket, cheek, and nose) of the face and is not necessarily a completely flat surface, as shown in FIG. 1B. Further, the tapered surface TP, which includes the three flat surface portions S31, S32, and S33, is disposed to the extent that it does not affect the video image light guided by the first surface S11 and other surfaces of the light guide prism 10. Moreover, the tapered surface TP, which employs a shape extending outward, is disposed to the extent that it does not block the wearer's vision of outside light acquired through the light guide prism 10 and the auxiliary prism 50 of the light guide device 20.

The light guide device 20 further has a connecting surface CS1 between the first surface SS1 and the flat plate section FB1 and a connecting surface CS2 between the first surface SS1 and the flat plate section FB2, as shown in FIG. 1A. The connecting surfaces CS1 and CS2 are inclined to planes perpendicular to the flat plate sections FB1 and FB2. For example, the connecting surfaces CS1 and CS2, when inclined to the surfaces perpendicular to the flat plate sections FB1 and FB2 by several degrees, provide a draft angle in molding processes, whereby the first and second surfaces SS1, SS2 can be transferred with increased precision in the molding processes.

A description will next be made of production of the light guide prism 10, which forms the light guide device 20, specifically, a process of molding the prism main body 10s made of a resin, which is a key component, with reference to FIG. 2. The auxiliary prism 50 will not be illustrated or described because it is molded in the same manner as the light guide prism 10.

Figure 2:
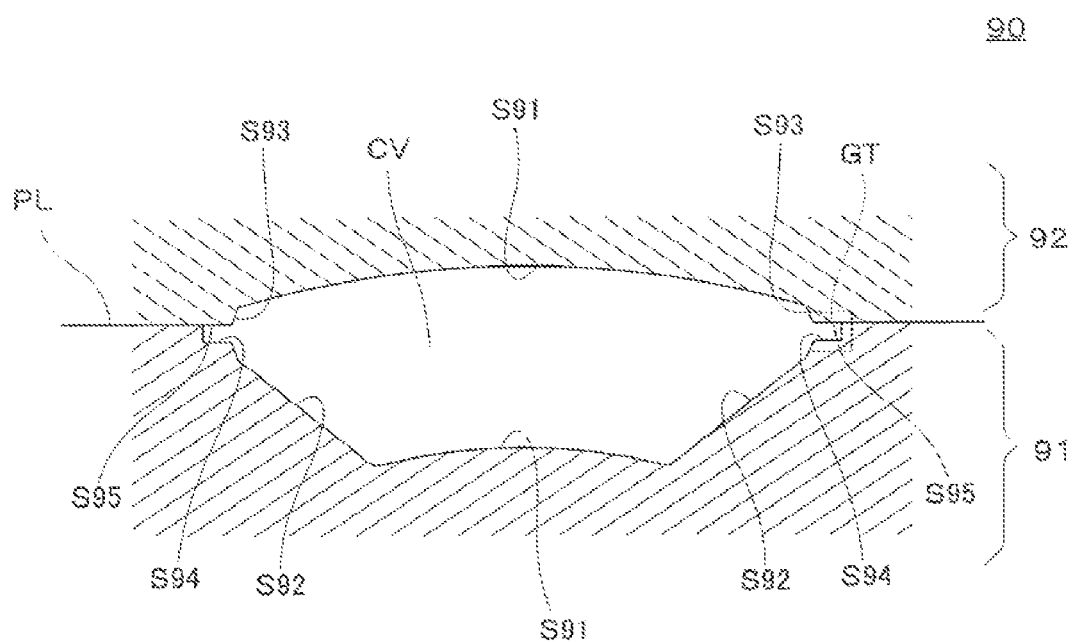
FIG. 2 is a cross-sectional side view of a molding die for describing molding of a prism in an injection molding process using the molding die.

FIG. 2 is a cross-sectional side view for describing molding of the prism main body 10s in an injection molding process using a molding die. A molding die 90 is formed of a first die 91 and a second die 92 as shown in FIG. 2, and the prism main body 10s can be molded by sandwiching a molding material with the first die 91 and the second die 92 and clamping the two dies 91 and 92. That is, the prism main body 10s having the curved surfaces described above, such as free-form surfaces, can be formed by allowing a molten resin to flow into the clamed molding die 90, which forms an internal space or a cavity CV, through a gate GT or a port through which the resin flows into the cavity CV and heating, cooling, pressurizing, depressurizing, and otherwise processing the molding die 90. The molding die 90 has transfer surfaces corresponding to the surfaces of the prism main body 10s, as shown in FIG. 2. Specifically, in the first and second dies 91, 92, transfer surfaces S91, which are free-form surfaces so formed that they face each other, correspond, for example, to the first surface S11 and the third surface S13 (see FIG. 1A and other figures), which contribute to light guiding. Further, a transfer surface S92 corresponds to the tapered surface TP, which includes the flat surface portions S31, S32, and S33, and other surface. In addition to the above, transfer surfaces S93 correspond to the connecting surfaces CS1 and CS2, and transfer surfaces S94 and S95 correspond to the surfaces of the flat plate sections FB1 and FB2, that is, the bonding ribs 10n and 10p. Portions left when they are cut off the gate GT form the gate portions GP1 and GP2.

The transfer surfaces S94 and S95 corresponding to the flat plate sections FB1 and FB2 are so arranged that the transfer surface S95 extends along a parting line PL of the molding die 90 and the transfer surface S94 extends in parallel to the parting line PL, as shown in FIG. 2. That is, the flat plate sections FB1 and FB2 are formed along the parting line PL. In this case, the bonding ribs 10n and 10p of the rib 60 are formed in a simple manner but with high precision and can therefore be used as reference surfaces when the light guide prism 10 and the auxiliary prism 50 are bonded to each other.

Referring back to FIGS. 1A and 1B, a description will next be made of a process of aligning the light guide prism 10 and the auxiliary prism 50 with each other when they are bonded to each other by using the bonding ribs 10n and 10p as a reference. First, before the bonding operation, each of the bonding ribs 10n and 10p is formed of the following portions separate from each other: a portion on the light guide prism 10; and a portion on the auxiliary prism 50. For example, the upper-end-side bonding rib 10n is formed of the following separate portions: a first bonding rib R1 including the gate portion GP1 and a flat plate portion F1, which will form part of the flat plate section FB1, on the light guide prism 10; and a second bonding rib R2 including the gate portion GP2 and a flat plate portion F2, which will form part of the remaining flat plate section FB1, on the auxiliary prism 50, and the bonding rib 10n is formed by bonding the first bonding rib R1 and the second bonding rib R2 to each other. The bonding process is carried out by using the flat plate portions F1 and F2 (flat plate section FB1) of the first and second bonding ribs R1, R2 as a reference, which are formed along the parting line PL (see FIG. 2) in the die molding process. The light guide prism 10 and the auxiliary prism 50 can thus be bonded to each other with a precise relative positional relationship therebetween. That is, a precise relative positional relationship among the free-form surfaces formed on the light guide prism 10 and the auxiliary prism 50 can be achieved and hence the light guide device 20 can have highly precise curved surfaces.

Figure 3:
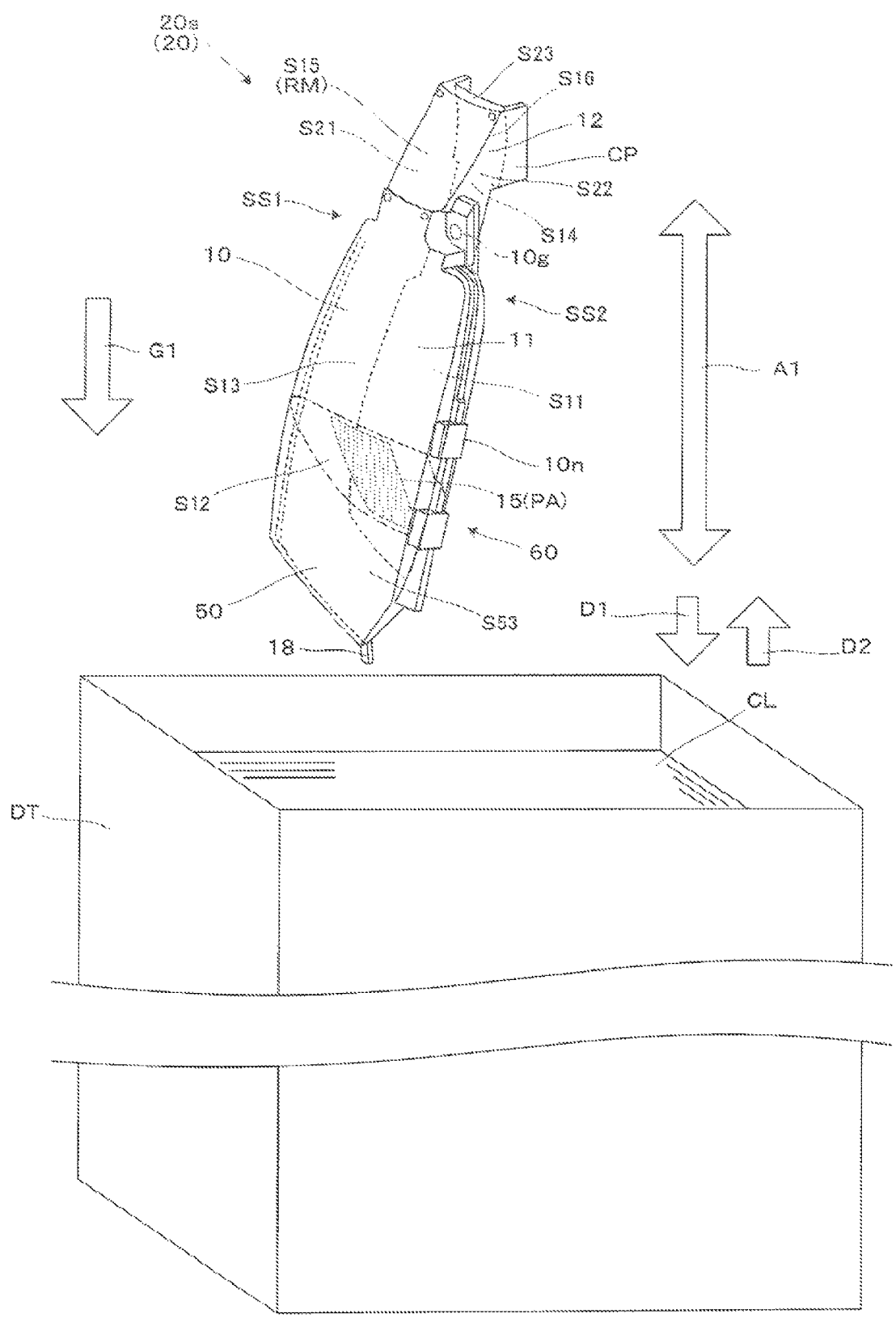
FIG. 3 is a perspective view for describing formation of a hard coat layer.

A description will next be made of formation of the hard coat layer 27 with reference to FIG. 3. FIG. 3 shows the light guide device 20 before and after a coating liquid that will form the hard coat layer 27 is applied. The coating liquid can be applied by using a variety of conceivable methods, for example, a dipping process or any other immersion-based formation process of a hard coat layer. In FIG. 3, the bidirectional arrow A1 represents a direction parallel to a suspension direction, that is, a direction parallel to a gravitational direction G1.

A brief description will next be made of formation of the hard coat layer 27 in a dipping process as an example of the film formation. First, before the coating liquid film formation, a surface of a substrate 20s, which will form the light guide device 20, is cleaned, for example, with a cleaning liquid (not shown) and dried with a state in which no dust or any other dirt adheres to the surface maintained. The substrate 20s is then immersed in a processing tank DT filled with a coating liquid CL containing a resin material, as indicated by the arrow D1 in FIG. 3, so that the coat liquid CL sufficiently spreads over the entire surface of the substrate 20s. The substrate 20s is then lifted and removed from the processing tank DT, as indicated by the arrow D2. The coating liquid CL, which will form the hard coat layer 27 formed over the entire surface, is thus applied in the dipping process described above.

After the dipping process described above, the light guide device 20 is so suspended that the dripping liquid guide portion 18, which is formed on the end facing away from the root portion RP, is the lowest end in the gravitational direction. In this case, in particular, all excess coating liquid CL on the surfaces involved in light guiding and see-through observation can be guided to the dripping liquid guide portion 18, that is, the dripping liquid guide portion 18 can be used to control the flow of the coating liquid CL applied onto the surfaces in the dipping process, whereby the degree of coating unevenness can be reduced. Further, in this case, since the light guide device 20 can be immersed into and lifted up from the hard coating liquid tank, work efficiency can be improved.

The dripping liquid guide portion 18 may be cut off, for example, after the hard coat layer 27 is formed. Alternatively, when the dripping liquid guide portion 18 is left at the end of the light guide device 20 as shown in FIG. 3 and the light guide device 20 is used in a binocular virtual image display apparatus, the dripping liquid guide portion 18 can be hidden with a member provided on the nose side of the apparatus. In this case, the virtual image display apparatus with the dripping liquid guide portion 18 invisible in the external appearance can have a good external appearance without removal of the dripping liquid guide portion 18.

According to the light guide device 20 of the first embodiment described above, since the protruding rib 60 extending along the sideways end portion SP is provided, the first and second surfaces SS1, SS2 including the first surface S11 and other free-form surfaces can be aligned with another member that forms, for example, a virtual image display apparatus with high precision when the light guide device 20 is assembled to the other member by using part of the protruding rib 60, which is provided separately from the first and second surfaces SS1, SS2, as a reference, whereby the optical function of the light guide device 20 in the virtual image display apparatus or any other apparatus can be ensured. Further, the optical main body provided with the first and second surfaces SS1, SS2 has a shape similar to that of glasses and hence has a good external appearance.

Second Embodiment

A virtual image display apparatus according to a second embodiment of the invention will be described below in detail with reference to the drawings.

Figure 4:
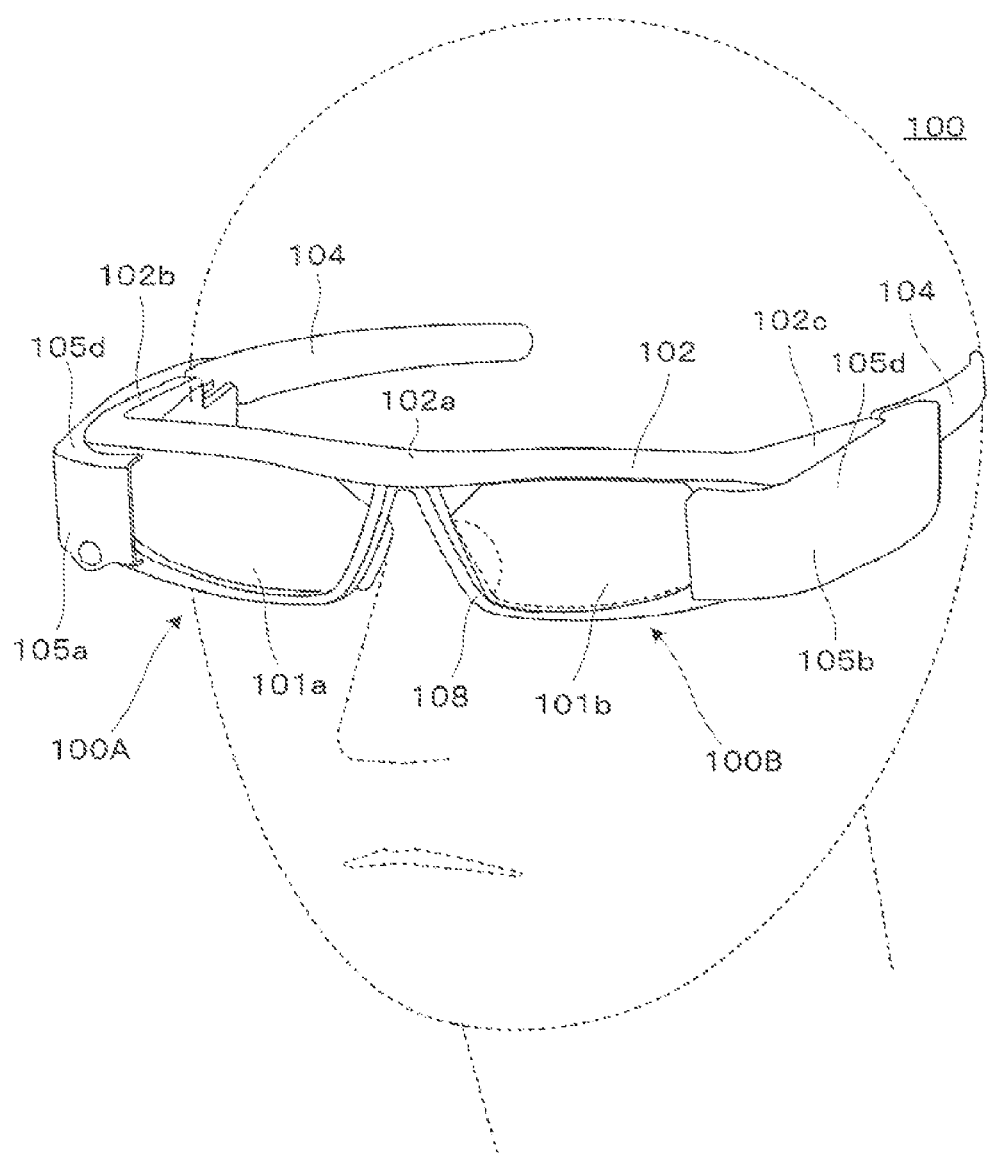
FIG. 4 is a perspective view for describing the external appearance of a virtual image display apparatus according to a second embodiment in which the light guide device is incorporated.

A virtual image display apparatus 100 according to the present embodiment is a head-mounted display having a glasses-like exterior appearance as shown in FIG. 4 and allows a viewer who wears the virtual image display apparatus 100 not only to visually recognize image light in the form of a virtual image but also to experience see-through visual recognition or observation of an image formed by outside light. The virtual image display apparatus 100 includes first and second optical portions 101a, 101b, which cover areas in front of the viewer's eyes in such a way that they allow see-through observation, a frame 102, which supports the optical portions 101a and 101b, and first and second image formation main body portions 105a, 105b, which are added to portions extending rearward from the right and left ends of the frame 102 to sidepiece portions (temples) 104. A first display unit 100A, which is a combination of the first optical portion 101a and the first image formation main body portion 105a on the left side in FIG. 4, is a portion that forms a virtual image for the right eye and functions by itself as a virtual image display apparatus. Similarly, a second display unit 100B, which is a combination of the second optical portion 101b and the second image formation main body portion 105b on the right side in FIG. 4, is a portion that forms a virtual image for the left eye and functions by itself as a virtual image display apparatus.

Figure 6:
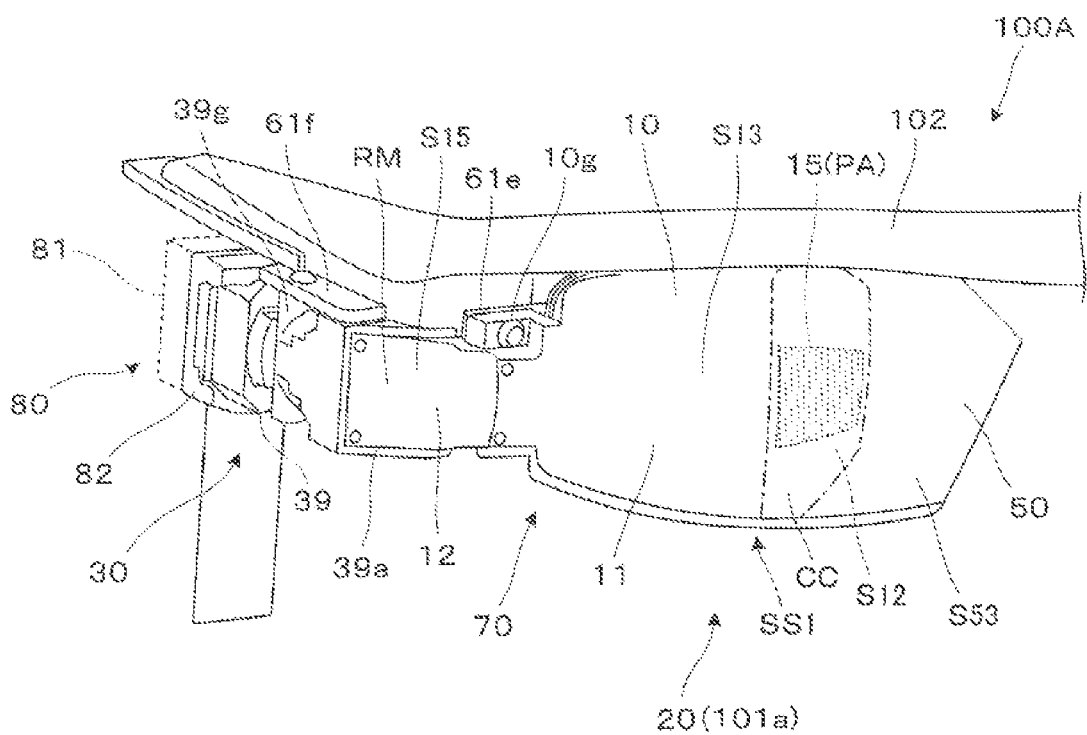
FIG. 6 is a perspective view showing a state in which the exterior member is omitted in order to describe the structure of a first display unit of the virtual image display apparatus.

FIGS. 5A and 5B compare the exterior appearance and the internal structure of the virtual image display apparatus 100. FIG. 5A shows the entire virtual image display apparatus 100, and FIG. 5B shows the internal structure of the virtual image display apparatus 100. FIG. 6 corresponds to the right half of the structure shown in FIG. 5B and is a partially enlarged perspective view of the first display unit 100A of the virtual image display apparatus 100.

The frame 102 provided in the virtual image display apparatus 100 is an elongated plate-shaped member having a U-like-bent shape and includes a front portion 102a extending rightward and leftward in the lateral direction (X direction) and a pair of side portions 102b and 102c extending forward and rearward in the depth direction (Z direction), as shown in FIG. 4. The frame 102, which is formed of the front portion 102a and the side portions 102b and 102c, is a metal integrated part made of aluminum or any other suitable metal material in a die-cast process. The width of the front portion 102a in the depth direction (Z direction) is sufficiently greater than the thickness or width of the light guide device 20 corresponding to each of the first and second optical portions 101a, 101b. The first optical portion 101a and the first image formation main body portion 105a, which are aligned with each other, are directly fixed to and supported by a sideways end portion 65a, which is a portion extending from the left end of the front portion 102a in a front view to the side portion 102b, with screws. Similarly, the second optical portion 101b and the second image formation main body portion 105b, which are aligned with each other, are directly fixed to and supported by a sideways end portion 65b, which is a portion extending from the right end of the front portion 102a in a front view to the side portion 102c, with screws. It is noted that the first optical portion 101a and the first image formation main body portion 105a are aligned with each other based on fitting connection, and that the second optical portion 101b and the second image formation main body portion 105b are aligned with each other based on fitting connection.

A protector 108 is fixed as an under-rim-shaped member or a frame-shaped member to the frame 102. A central portion 108g of the protector 108 is fixed to a central portion 102g of the frame 102 based on fitting and screwing connection. To this end, a recess 102k for fixing purposes is formed in the central portion 102g of the frame 102, and a threaded hole is formed at the center of the recess 102k, as shown in FIG. 5B. The protector 108 is not only an elongated plate-shaped member having a two-step-crank-like bent shape but also an integrate part made of a metal or resin material. The width of the protector 108 in the depth direction (Z direction) is comparable with the thickness or width of the light guide device 20 corresponding to each of the first and second optical portions 101a, 101b. A first end portion 108i of the protector 108 is fixed to the first image formation main body portion 105a based on fitting connection, and a second end portion 108j of the protector 108 is fixed to the second image formation main body portion 105b based on fitting connection.

The frame 102 not only supports the first and second image formation main body portions 105a, 105b but also has a role, in cooperation with cover-shaped exterior members 105d, which cover the main body portions 105a and 105b, in protecting the interior of the first and second image formation main body portions 105a, 105b. The protector 108 has a role in protecting side edge portions and a lower edge portion of each of the light guide devices 20 connected to the first and second image formation main body portions 105a, 105b. That is, even when the virtual image display apparatus 100 hits against or otherwise interact with an object therearound, the possibility of damage and positional shift of the first and second image formation main body portions 105a, 105b and the first and second optical portions 101a, 101b, particularly, the exposed light guide devices 20 can be reduced as long as the frame 102 and the protector 108 have sufficient strength.

Nose pad members 108a are formed on a pair of vertical portions 63a located close to the central portion 108g of the protector 108. The vertical portions 63a and lateral portions 63b of the protector 108 are separate from or weakly in contact with peripheral portions A0 of the light guide devices 20, unlike the root portions thereof connected to the first and second image formation main body portions 105a, 105b. The peripheral portions A0 of the light guide devices 20 are also separate from or weakly in contact with the front portion 102a of the frame 102. As described above, the light guide devices 20, specifically, the C-shaped peripheral portions A0 except the root portions are placed in the vicinity of the frame 102 and the protector 108 but are not fixed to the frame 102 or the protector 108. Therefore, when the central light guide devices 20 and a frame-shaped member 109, which includes the frame 102 and the protector 108, differ from each other in terms of the coefficient of thermal expansion, the light guide devices 20 are allowed to expand in the frame-shaped member 109, whereby no distortion, deformation, or breakage of the light guide devices 20 will occur.

The first display unit 100A includes, from a different point of view, a projection and see-through device 70, which is a projection system, and an image display device 80, which forms video image light, as shown in FIG. 6. The projection and see-through device 70 has a role in projecting an image formed by the first image formation main body portion 105a in the form of a virtual image onto the viewer's eye. The projection and see-through device 70 includes the light guide device 20 and the projection lens 30 for image formation.

The light guide device 20 is formed of the light guide prism 10 and the auxiliary prism 50 integrated with each other, as described above. The light guide device 20 in the projection and see-through device 70 corresponds to the first optical portion 101a in FIG. 4, and the projection lens 30 in the projection and see-through device 70 and the image display device 80, which forms an image pattern to be displayed, correspond to the first image formation main body portion 105*a* in FIG. 4. The dripping liquid guide portion 18 (see FIG. 3 and other figures) provided at the end of the auxiliary prism 50 may be hidden, for example, behind part of the protector 108 or cut off before the light guide device 20 is assembled to the frame 102 and other portions. The dripping liquid guide portion 18 is therefore omitted in FIG. 6.

Figure 7A:
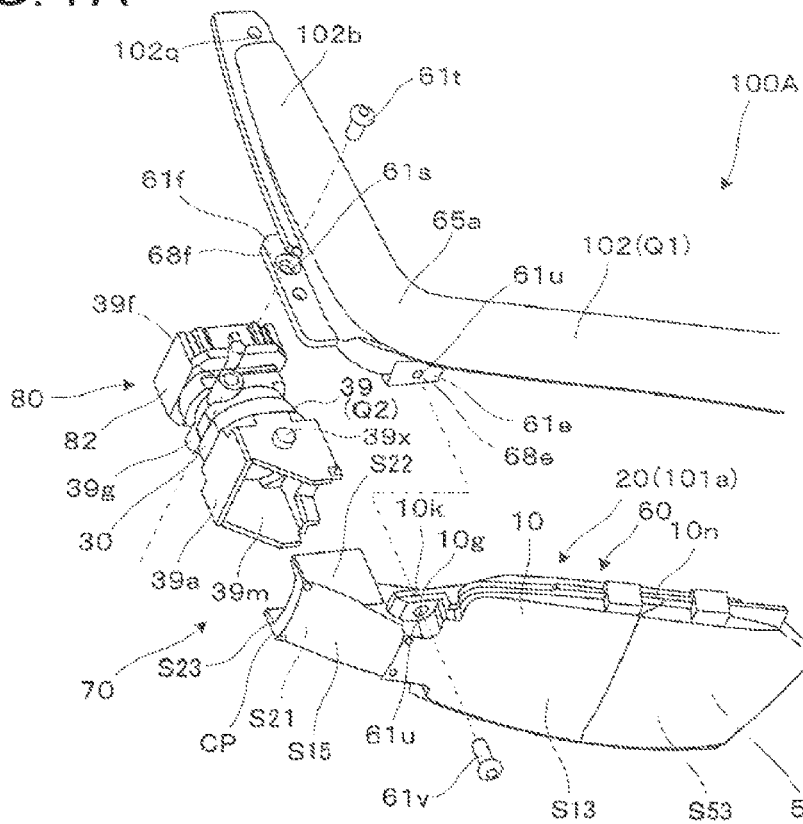
FIGS. 7A and 7B are exploded perspective views for describing how the prism and a projection lens of the virtual image display apparatus are fixed to a frame.

A description will be made of the assembly of the first display unit 100A to the frame 102 with reference to FIGS. 7A and 7B and other figures. The projection lens 30, which forms the first image formation main body portion 105*a*, is directly fixed to a first fixing portion 61*f* provided at the sideways end portion 65*a* of the frame 102 by using an attachment portion 39*g* so formed that it is embedded in a lens barrel 39 of the projection lens 30. In the fixing process, a rear surface 68*f* of the first fixing portion 61*f*, an upper end surface 39*f* of the attachment portion 39*g*, and other portions come into contact and are aligned with each other, and the projection lens 30 and the frame 102 are detachably and reliably fixed to each other when a screw 61*t* is screwed into the attachment portion 39*g* through a screw hole 61*s*. In this process, a boss 39*x* provided on the lens barrel 39 fits into a boss hole 61*x* in the frame 102 to prevent the lens barrel 39 from rotating, whereby the lens barrel 39 is positioned also in the rotational direction. On the other hand, the light guide device 20, which is the first optical portion 101*a*, is directly fixed to a second fixing portion 61*e* provided on the sideways end portion 65*a* of the frame 102 by using the protruding attachment portion 10*g* formed on a neck portion of the light guide device 20 (corresponding to coupling portion BP in FIG. 1A). The attachment portion 10*g* is so configured that it stands and extends outward from the periphery of the boundary between the first prism portion 11 and the second prism portion 12. In the fixing process described above, the flat surface portion 10*h* or the rear surface of the attachment portion 10*g* comes into contact and is aligned with a stopper surface 68*e* provided on a front portion of the second fixing portion 61*e*, and the light guide device 20 and the frame 102 can be detachably and reliably fixed to each other when a screw 61*v* is screwed into the attachment portion 10*g* through a screw hole 61*u*. From a different point of view, the light guide device 20, which has the frame attaching rib 10*k* including the attachment portion 10*g*, can be aligned with precision with the frame 102, which is another member for the light guide device 20 (first another member Q1). The image display device 80 shown in FIG. 6 and other figures is fit into and fixed to the rear end of the lens barrel 39 of the projection lens 30.

The light guide device 20 is positioned with respect to the projection lens 30 when the connecting portion CP, which is an end portion of the light guide prism 10 on the side where the second prism portion 12 is present, is fit into an engaging member 39*a* provided at the front end of the lens barrel 39 of the projection lens 30 and having a rectangular-frame-like shape with an opening. That is, when the light guide prism 10 provided in the light guide device 20 is fixed to the second fixing portion 61*e* of the frame 102, the connecting portion CP located on the side where the second prism portion 12 is present is so inserted that the connecting portion CP fits into the engaging member 39*a* of the lens barrel 39. In this process, the reference surfaces S21 to S23 of the connecting portion CP come into contact and are aligned with an inner surface 39*m* of the engaging member 39*a*. From a different point of view, the light guide device 20, which has the connecting portion CP, can be aligned with precision with the lens barrel 39 (second another member Q2), which forms part of the image formation main body portion 105*a*, which is another member for the light guide device 20.

Figure 7B:
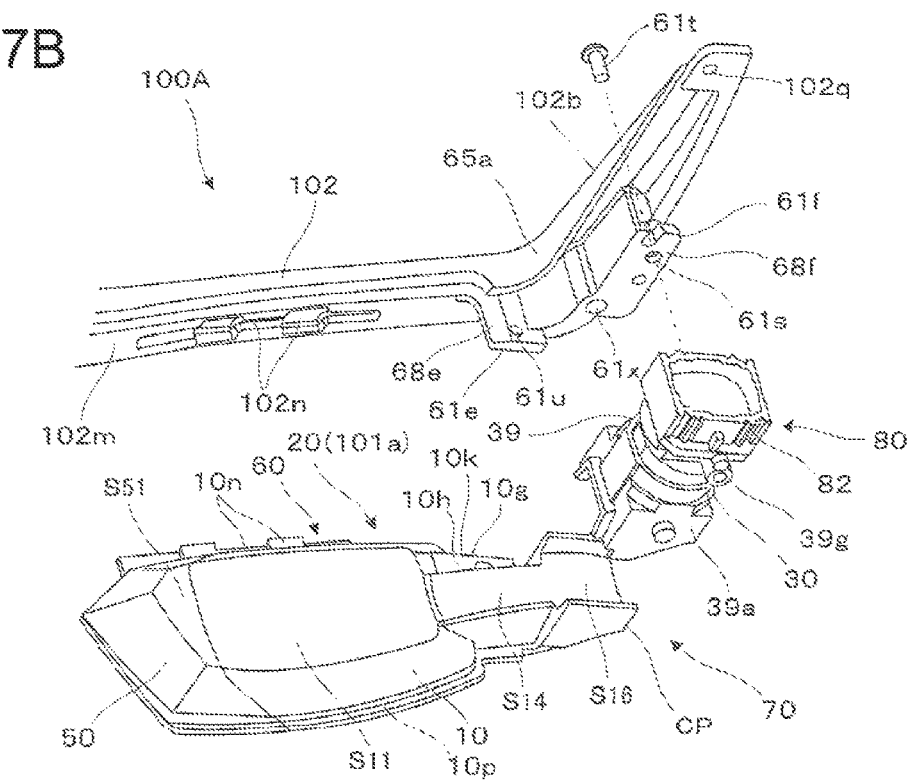

A groove-shaped limiting portion 102*n* is provided as a stopper in a lower surface 102*m* of the front portion 102*a* of the frame 102, as shown in FIG. 7B. After the assembly of the light guide device 20, the protruding bonding rib 10*n* provided on the upper end of the rib 60 of the light guide prism 10 provided in the light guide device 20 is inserted and fit into the limiting portion 102*n* with a play or a slight gap between the bonding rib 10*n* and the limiting portion 102*n*, whereby displacement of the end of the light guide device 20 can be limited in the depth direction (Z direction shown in FIG. 5B) of the frame 102. From a different point of view, the rib 60 limits displacement of the first and second surfaces SS1, SS2 (see FIG. 1A and other figures) relative to the frame 102 when the light guide device 20 is attached to the frame 102. The bonding rib 10*n* of the light guide device 20 and the limiting portion 102*n* of the frame 102 extend rightward and leftward in the lateral direction (X direction) and the bonding rib 10*n* and the limiting portion 102*n* are not in close contact with or bonded to each other, the state in which the light guide device 20 is not fixed to the frame 102 is ensured. Further, the light guide device 20 is slightly separate from the protector 108 and hence is not fixed to the protector 108. As a result, the light guide device 20 is allowed, for example, to expand with respect to the frame 102 when the light guide device 20 and the frame 102 differ from each other in terms of the coefficient of thermal expansion.

The frame 102 and the projection and see-through device 70 can thus be assembled (see FIG. 5B) by carrying out the steps described above.

In the assembly of the light guide device 20 described above, the gate portions GP1 and GP2, which are part of the bonding rib 10*n* of the rib 60, can be hidden along with other portions in the external appearance, whereby removal of or other measures against the gate portions GP1 and GP2 can be simplified.

Figure 8:
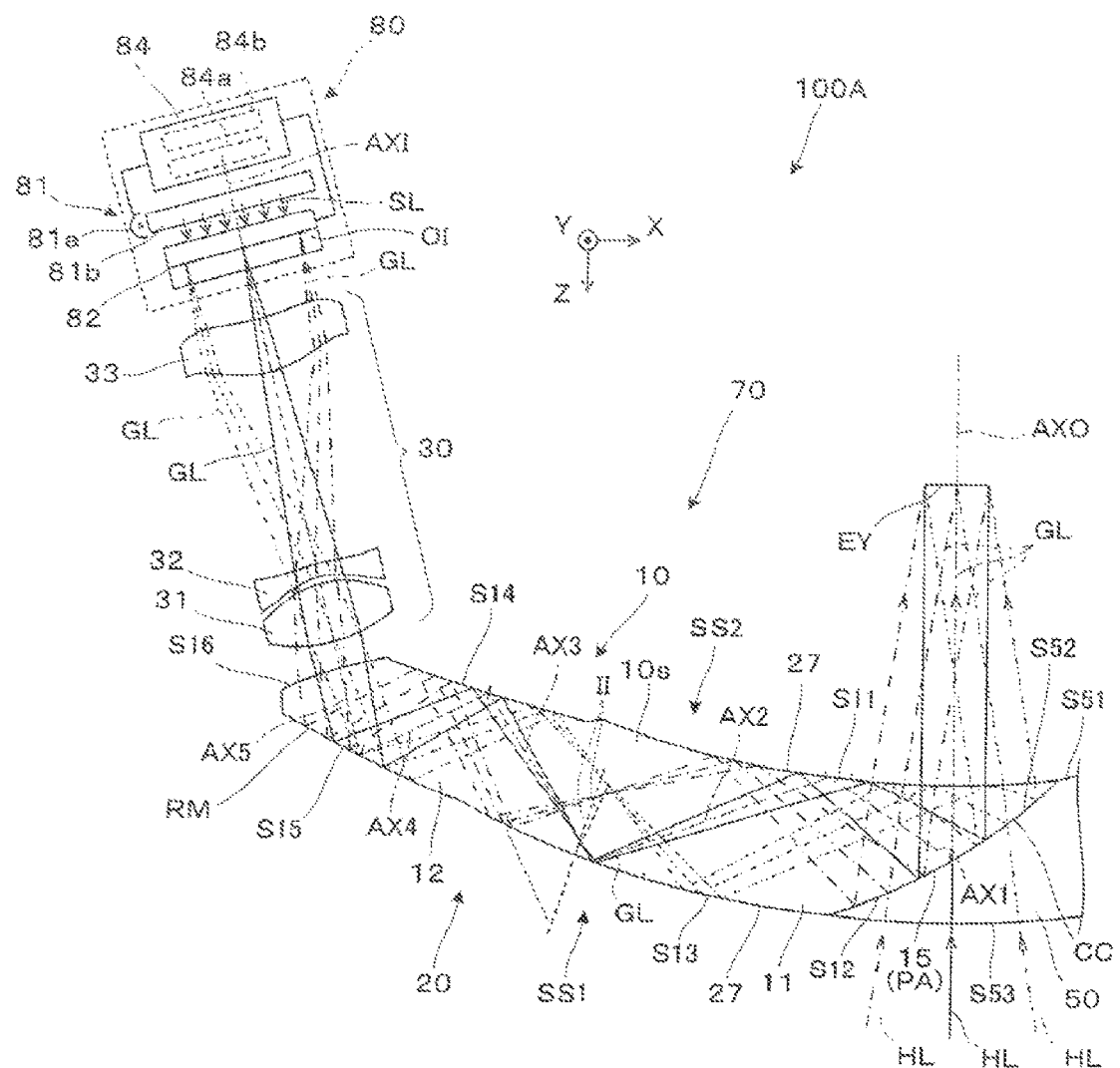
FIG. 8 is a cross-sectional view taken along a plane which is present in a first display unit that forms the virtual image display apparatus and with respect to which the first display unit is symmetric.

A description will be made of the function, operation, and other features of the projection and see-through device 70 and other components with reference to FIG. 8. In the projection and see-through device 70, the surfaces of the light guide prism 10 are configured as follows: The first surface S11 is a free-form surface formed around a light-exiting-side optical axis AXO parallel to the Z axis; the second surface S12 is a free-form surface formed around an optical axis AX1 present in a reference plane (cross-sectional plane in FIG. 8) parallel to the XZ plane and inclined to the Z axis; the third surface S13 is a free-form surface formed around the light-exiting-side optical axis AXO; the fourth surface S14 is a free-form surface formed around the bisector of a pair of optical axes AX3 and AX4 present in the reference plane described above parallel to the XZ plane and inclined to the Z axis; the fifth surface S15 is a free-form surface formed around the bisector of a pair of optical axes AX4 and AX5 present in the reference plane described above parallel to the XZ plane and inclined to the Z axis; and the sixth surface S16 is a free-form surface formed around the optical axis AX5 present in the reference plane described above parallel to the XZ plane and inclined to the Z axis. Each of the first to sixth surfaces S11 to S16 described above has a shape symmetric in the vertical (upward and downward) Y-axis direction with respect to the reference plane (cross-sectional plane in FIG. 8), which extends horizontally (or rightward and leftward), which is parallel to the XZ plane, and in which the optical axes AX1 to AX5 extend.

The image display device 80 includes an illuminator 81, which outputs two-dimensional illumination light SL, a video image display device 82, which is a transmissive spatial light modulator, and a drive controller 84, which controls the operation of the illuminator 81 and the video image display device 82.

The illuminator 81 in the image display device 80 includes a light source 81a, which emits light containing three color light fluxes, or red, green, and blue light fluxes, and a backlight guide 81b, which diffuses the light from the light source 81a into a light flux having a rectangular cross-sectional shape. The video image display device 82 is a video image device formed, for example, of a liquid crystal display device and spatially modulates the illumination light SL from the illuminator 81 to form image light to be displayed, such as motion images. The drive controller 84 includes a light source drive circuit 84a and a liquid crystal drive circuit 84b. The light source drive circuit 84a supplies the light source 81a in the illuminator 81 with electric power to allow the light source 81a to emit the illumination light SL having stable luminance. The liquid crystal drive circuit 84b outputs an image signal or a drive signal to the video image display device (video image device) 82 to cause it to form color video image light or color image light in the form of a transmittance pattern based on which motion images or still images are formed. An image processing capability can be added to the liquid crystal drive circuit 84b, or an external control circuit with an image processing capability can be used.

The optical path of the video image light GL and other light in the virtual image display apparatus 100 will be described below. The video image light GL having exited out of the video image display device (video image device) 82 converges through the projection lens 30 and impinges on the sixth surface S16, which is a surface of the light guide prism 10 and has relatively large positive power.

The video image light GL having passed through the sixth surface S16 of the light guide prism 10 travels while converging and passes through the second prism portion 12, where the video image light GL is reflected off the fifth surface S15, which has relatively small positive power, and then reflected off the fourth surface S14, which has relatively small negative power.

The video image light GL reflected off the fourth surface S14 of the second prism portion 12 enters the first prism portion 11, where the video image light GL is incident on and totally reflected off the third surface S13, which has relatively small positive power, and the video image light GL is then incident on and totally reflected off the first surface S11, which has relatively small negative power. It is noted that the video image light GL forms an intermediate image in the light guide prism 10 before or after the video image light GL travels via the third surface S13. An image plane II of the intermediate image corresponds to an image plane (display position) OI of the video image display device 82.

The video image light GL totally reflected off the first surface S11 is incident on the second surface S12, and the video image light GL incident on the half-silvered mirror layer 15, which is a light reflective film RM, in particular, partially passes through the half-silvered mirror layer 15 and is partially reflected off the half-silvered mirror layer 15. The partially reflected video image light GL is then incident on the first surface S11 again and passes therethrough. The half-silvered mirror layer 15 acts as a component having relatively large positive power on the video image light GL to be reflected off the half-silvered mirror layer 15. The first surface S11 acts, on the other hand, as a component having negative power on the video image light GL passing through the first surface S11.

The video image light GL having passed through the first surface S11 forms a substantially parallelized light flux and impinges on the pupil of the viewer's eye EY. That is, the video image light GL in the form of a virtual image allows the viewer to observe the image formed on the video image display device 82.

On the other hand, a portion of outside light HL that is incident on the light guide prism 10 in an area next to the second surface S12 on the −X side passes through the third surface S13 and the first surface S11 of the first prism portion 11. In this process, the positive power and the negative power of the two surfaces are canceled with each other and aberrations are corrected at the same time. That is, the viewer observes through the light guide prism 10 an image formed by the outside light that is not greatly distorted. Similarly, a portion of the outside light HL that is incident on the light guide prism 10 in an area next to the second surface S12 on the +X side, that is, a portion of the outside light HL that is incident on the auxiliary prism 50, passes through the third transmissive surface S53 and the first transmissive surface S51 of the auxiliary prism 50. In this process, the positive power and the negative power of the two surfaces cancel with each other and aberrations are corrected at the same time. That is, the viewer observes through the auxiliary prism 50 an image formed by the outside light that is not greatly distorted. Further, a portion of the outside light HL that is incident on an overlapping portion where the auxiliary prism 50 faces the second surface S12 of the light guide prism 10 passes through the third transmissive surface S53 and the first surface S11. In this process, the positive power and the negative power of the two surfaces cancel with each other and aberrations are corrected at the same time. That is, the viewer observes through the auxiliary prism 50 an image formed by the outside light that is not greatly distorted. The second surface S12 of the light guide prism 10 and the second transmissive surface S52 of the auxiliary prism 50 have substantially the same curved shape and substantially the same refractive index, and the gap between the two surfaces is filled with the adhesive layer CC having a refractive index substantially equal to those of the light guide prism 10 and the auxiliary prism 50. That is, neither the second surface S12 of the light guide prism 10 nor the second transmissive surface S52 of the auxiliary prism 50 acts as a refraction surface on the outside light HL.

However, since the outside light HL incident on the half-silvered mirror layer 15 partially passes through the half-silvered mirror layer 15 and is partially reflected off the half-silvered mirror layer 15 at the same time, the outside light HL oriented in the direction corresponding to the half-silvered mirror layer 15 toward the eye EY is attenuated in accordance with the transmittance of the half-silvered mirror layer 15. On the other hand, since the video image light GL traveling in the direction corresponding to the half-silvered mirror layer 15 toward the eye EY is incident on the eye EY, the viewer observes an image formed by the outside light as well as the image formed on the video image display device (video image device) 82 in the direction toward the half-silvered mirror layer 15.

The video image light GL having traveled through the light guide prism 10 and impinged on the second surface S12 but not having been reflected off the half-silvered mirror layer 15 enters the auxiliary prism 50, but an antireflection portion (not shown) provided in the auxiliary prism 50 prevents the incident video image light from returning into the light guide prism 10. That is, the video image light GL having passed through the second surface S12 is not allowed to return back to the optical path or form stray light. Further, the outside light HL incident through the auxiliary prism 50 and reflected off the half-silvered mirror layer 15 returns into the auxiliary prism 50, but the antireflection portion (not shown) provided in the auxiliary prism 50 described above prevents the outside light from entering the light guide prism 10. That is, the outside light HL reflected off the half-silvered mirror layer 15 is not allowed to return back to the optical path or form stray light.

As clearly described above, according to the virtual image display apparatus 100 of the present embodiment, since the light guide device 20 is directly fixed to the frame 102 via the attachment portion 10g, which is a portion in the periphery of the light guide device 20, not only can the light guide device 20 be readily fixed and the weight of the virtual image display apparatus 100 can be readily reduced but also the strength at which the frame 102 supports the light guide device 20 is improved. Further, except the attachment portion 10g, the remaining peripheral portion A0 of the light guide device 20 is not fixed to the frame 102 or the protector 108. Therefore, when the light guide device 20, the frame 120, and other portions differ from each other in terms of the coefficient of thermal expansion, the light guide device 20 is allowed to expand with respect to the frame 102 and the other portions, whereby no distortion, deformation, or breakage of the light guide device 20 will occur. As described above, the virtual image display apparatus 100 can be assembled in a reliable, precise manner while the optical function of the light guide device 20 is ensured. Since the shape of the light guide device 20 is similar to that of glasses and hence has a good appearance, the entire virtual image display apparatus 100 also has a good appearance.

Further, according to the virtual image display apparatus 100 of the present embodiment, the protector 108 covers and protects part of the periphery of the light guide device 20, specifically, except the attachment portion 10g fixed to the frame 102, the protector 108 covers and protects at least part of the remaining peripheral portion A0. That is, the frame 102 and the protector 108 can cover and protect the light guide device 20 by surrounding the periphery thereof, whereby durability of the virtual image display apparatus 100 can be improved against a strong impact produced, for example, when the virtual image display apparatus 100 accidentally falls and acting in an arbitrary direction.

Third Embodiment

A virtual image display apparatus according to a third embodiment will be described below. The virtual image display apparatus according to the present embodiment is a variation of the virtual image display apparatus 100 according to the first embodiment and is the same as the virtual image display apparatus 100 shown in FIGS. 1A and 1B and other figures unless otherwise specified.

Figure 9A:
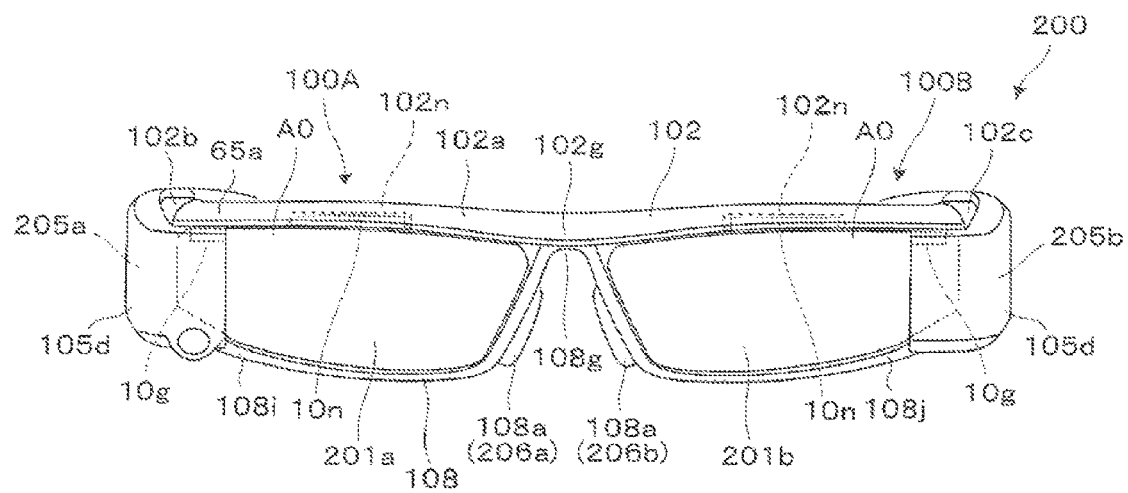
FIG. 9A is a front view for describing a virtual image display apparatus according to a third embodiment of the invention.
Figure 9B:
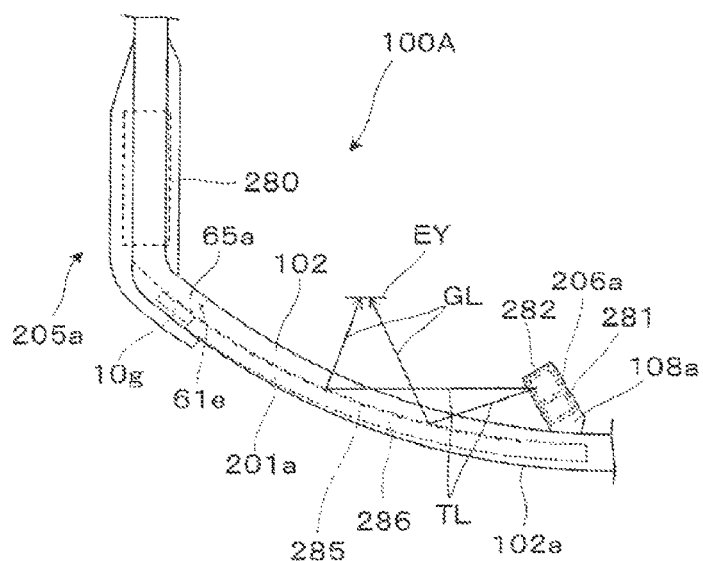
FIG. 9B is a plan view for describing the structure of a first display unit of the virtual image display apparatus.

A virtual image display apparatus 200 according to the present embodiment will be described below with reference to FIGS. 9A and 9B. The virtual image display apparatus 200 according to the present embodiment includes first and second optical members 201a, 201b, which cover areas in front of the viewer's eyes in such a way that they allow see-through observation, a frame 102, which supports the optical members 201a and 201b, first and second drivers 205a, 205b, which are fixed to portions extending rearward from the right and left ends of the frame 102, and first and second video image devices 206a, 206b, which output signal light with which a target object is two-dimensionally scanned. A first display unit 100A, which is a combination of the first optical member 201a, the first driver 205a, and the first video image device 206a on the left side in FIG. 9A, is a portion that forms a virtual image for the right eye and functions by itself as a virtual image display apparatus. Similarly, a second display unit 100B, which is a combination of the second optical member 201b, the second driver 205b, and the second video image device 206b on the right side in FIG. 9A, is a portion that forms a virtual image for the left eye and has the same function as that of the first display unit 100A because the second display unit 100B is simply a horizontally reversed version of the first display unit 100A.

In the first display unit 100A, the first video image device 206a forms signal light modulated in terms of intensity and outputs the signal light in the form of scan light TL. The first optical member 201a is a member irradiated with the scan light TL from the first video image device 206a and reflecting the scan light TL to form image light GL and has a function of guiding the image light GL to an eye EY. The first driver 205a includes a main body portion 280 including a light source that supplies the first video image device 206a with illumination light, for example, via an optical fiber (not shown) and a control circuit that operates the first video image device 206a and other components.

The first video image device 206a is assembled to a nose pad member 108a and hence indirectly fixed to the frame 102. The first video image device 206a includes a signal light modulator 281, which modulates the illumination light from the main body portion 280 based on a control signal, and a scan system 282, which outputs the signal outputted from the signal light modulator 281 and scans a target object with the signal light. The scan system 282 is formed, for example, of a MEMS mirror and changes its attitude in synchronization with the modulation of the signal light performed by the signal light modulator 281 to adjust the optical path of the signal light so as to perform two-dimensional scan in which the exit angle of the light beam (scan light TL) directed toward the inner surface of the first optical member 201a is changed in the horizontal and vertical directions.

The first optical member 201a is disposed in a position in front of the first video image device 206a or in a position along the light exit direction of thereof in such a way that the first optical member 201a covers an area in front of the wearer's eye EY. The first optical member 201a includes a semi-transmissive/semi-reflective film 285, which is a semi-transparent film irradiated with the scan light, and a support 286, which supports and fixes the semi-transparent/semi-reflective film 285. The thus configured first optical member 201a allows not only a virtual image formed by the image light GL but also light from the outside to be incident on the wearer's eye EY. The virtual image display apparatus 200 thus has a see-through configuration in which the two types of light are superimposed on each other for observation. The semi-transparent/semi-reflective film 285 can be a half-silvered mirror or a hologram or any other refractive optical element.

The first optical member 201a is not an internal-propagation-type light guide unlike the first optical member 101a in the first embodiment but has a thin elliptical shape that covers an area in front of an eye and includes the attachment portion 10g and the rib 10n in the peripheral portion A0, which is part of the outer circumference of the first optical member 201a, as in the first embodiment.

A description will be made of the assembly of the first optical member 201a to the frame 102. The first optical member 201a is directly fixed to the second fixing portion 61e provided at the sideways end portion 65a located at a sideways portion of the frame 102 by using the protruding attachment portion 10g formed on the peripheral portion A0. The first optical member 201a is thus aligned with the first video image device 206a and other components. The groove-shaped limiting portion 102n is provided as a stopper in the frame 102. When the first optical member 201a is assembled, the protruding rib 10n provided on the upper end of the first optical member 201a is inserted and fit into the limiting portion 102n with a play or a slight gap between the rib 10n and the limiting portion 102n, whereby displacement of the end of the first optical member 201a can be limited in the depth direction of the frame 102. The portion of the first optical member 201a except the attachment portion 10g is slightly separate from the frame 102 and the protector 108 and is not fixed to the frame 102 or the protector 108.

The image formation operation will be described below. First, the signal light modulator 281 in the first video image device 206a forms and outputs signal light produced by modulating the illumination light in accordance with the luminance of each pixel that forms an image. The signal light outputted from the signal light modulator 281 is incident on the scan system 282, which is a scanner. The scan system 282 outputs the signal light in the form of the scan light TL toward the first optical member 201a. The first optical member 201a, on which the scan light TL is incident, forms a virtual image based on the image light GL reflected off the first optical member 201a, and the viewer captures the virtual image with the eye EY and recognizes the image.

The invention has been described with reference to the above embodiments, but the invention is not limited thereto. The invention can be implemented in a variety of other aspects to the extent that they do not depart from the substance of the invention. For example, the following variations are conceivable.

In the above description, each of the surfaces S11 to S16 of the light guide prism 10 is a free-form surface, but the light guide prism 10 is not necessarily configured this way. For example, part of the surfaces may be a curved surface other than a free-form surface.

In the above description, the frame 102 and the projection lens 30 are separate from each other, and the projection lens 30 is fixed to the frame 102 with a screw. The lens barrel 39 of the projection lens 30 may instead be formed integrally with the frame 102. An example of a method for forming the lens barrel 39 integrally with the frame 102 includes machining a lens barrel after outsert molding or die-cast integral molding.

The light guide device 20 and the projection lens 30 are not necessarily connected to the frame 102 with screws but can be fixed to the frame 102 based on a variety of other methods.

In the above description, the protector 108 is attached to the frame 102, but the protector 108 can be omitted. In this case, the shape of the frame 102 shown in FIG. 5B and other figures is maintained as it is, and an auxiliary member provided with the nose pad members 108a can be connected to the central portion 102g of the frame 102, or the frame 102 integrally provided with the auxiliary member can be provided in advance. The auxiliary member can be used as a member that protects the light guide device 20 as the vertical portions 63a of the protector 108 can. Further, the frame 102 and the protector 108 can be formed integrally with each other.

In the above description, the light guide device 20 is supported as a cantilever fixed to the frame 102. The light guide device 20 can instead be so supported that the entire periphery thereof is supported by the frame 102 and the protector 108. In this case, each of the frame 102 and the protector 108 is desirably provided with a member or a mechanism that allows relative expansion or shrinkage of the light guide device 20.

In the above description, the projection lens 30 is disposed on the light incident side of the light guide prism 10. Instead, the projection lens 30 can be omitted, and an image formation capability can be added to the light guide prism 10 itself, or the projection lens 30 can be replaced with another light guide prism 10 having an image formation capability.

In the above description, the frame 102 is provided with the limiting portion 102n. In place thereof or in addition thereto, the protector 108 can be provided with a limiting portion for preventing deformation, shaking, and other disadvantageous phenomena of the light guide prism 10.

In the above description, the lens barrel 39 of the projection lens 30 is provided with the engaging member 39a, which engages with the light guide device 20. The light guide device 20 can instead be provided with an engaging member that, for example, fits into the lens barrel 39 in such a way that the engaging member sandwiches the lens barrel 39.

In the above description, the half-silvered mirror layer (semi-transmissive/semi-reflective film) 15 is formed in a laterally elongated rectangular area. The contour of the half-silvered mirror layer 15 can be changed as appropriate in accordance with an application of interest and other usages. Further, the transmittance and reflectance of the half-silvered mirror layer 15 can be changed in accordance with an application of interest and other factors.

In the above description, the half-silvered mirror layer 15 is a simple semi-transmissive film (metal reflection film or dielectric multilayer film, for example), and the half-silvered mirror layer 15 can instead be a flat-surface or curved-surface hologram element.

In the above description, the luminance distribution of an image displayed on the video image display device 82 is not particularly adjusted. When the luminance varies position to position, for example, the luminance distribution of a displayed image can be nonuniformly adjusted.

In the above description, the image display device 80 includes the video image display device 82 formed, for example, of a transmissive liquid crystal display device. The image display device 80 does not necessarily include the video image display device 82 formed, for example, of a transmissive liquid crystal display device and can instead be any other device. For example, the image display device 80 can include a reflective liquid crystal display device, or the video image display device 82 formed, for example, of a liquid crystal display device can be replaced, for example, with a digital micromirror device. Further, the image display device 80 can include a self-luminous device, representative examples of which include an LED array and an GELD (organic EL display).

In the above description, the image display device 80 formed, for example, of a transmissive liquid crystal display device is used and can instead be a scan-type image display device.

Specifically, the first display unit 100A as the virtual image display apparatus includes the light guide device 20 and an image display device 380. The light guide device 20 is an optical member having the same function and structure as those in the embodiments described above and no detailed description thereof will therefore be made. The image display device 380 is a device that forms signal light modulated in terms of intensity and outputs the signal light as scan light TL and includes a signal light formation portion 381 and a scan system 382.

The signal light formation portion 381 includes a light source and outputs signal light LL formed by modulating light from the light source based on a control signal from a control circuit (not shown). The scan system 382 outputs the signal light LL outputted from the signal light formation portion 381 and scans a target object with the signal light. The scan system 382 is formed, for example, of a MEMS mirror and changes its attitude in synchronization with the modulation of the signal light LL performed by the signal light formation portion 381 to adjust the optical path of the signal light LL so as to perform two-dimensional scan in which the exit angle of the light beam (scan light TL) is changed in the horizontal and vertical directions. The thus configured image display device 380 causes the scan light TL, which will form video image light GL, to be incident on the light guide device 20 and an entire partial area of the second surface S12 where the half-silvered mirror layer 15 is formed to be scanned with the scan light TL.

Figure 10:
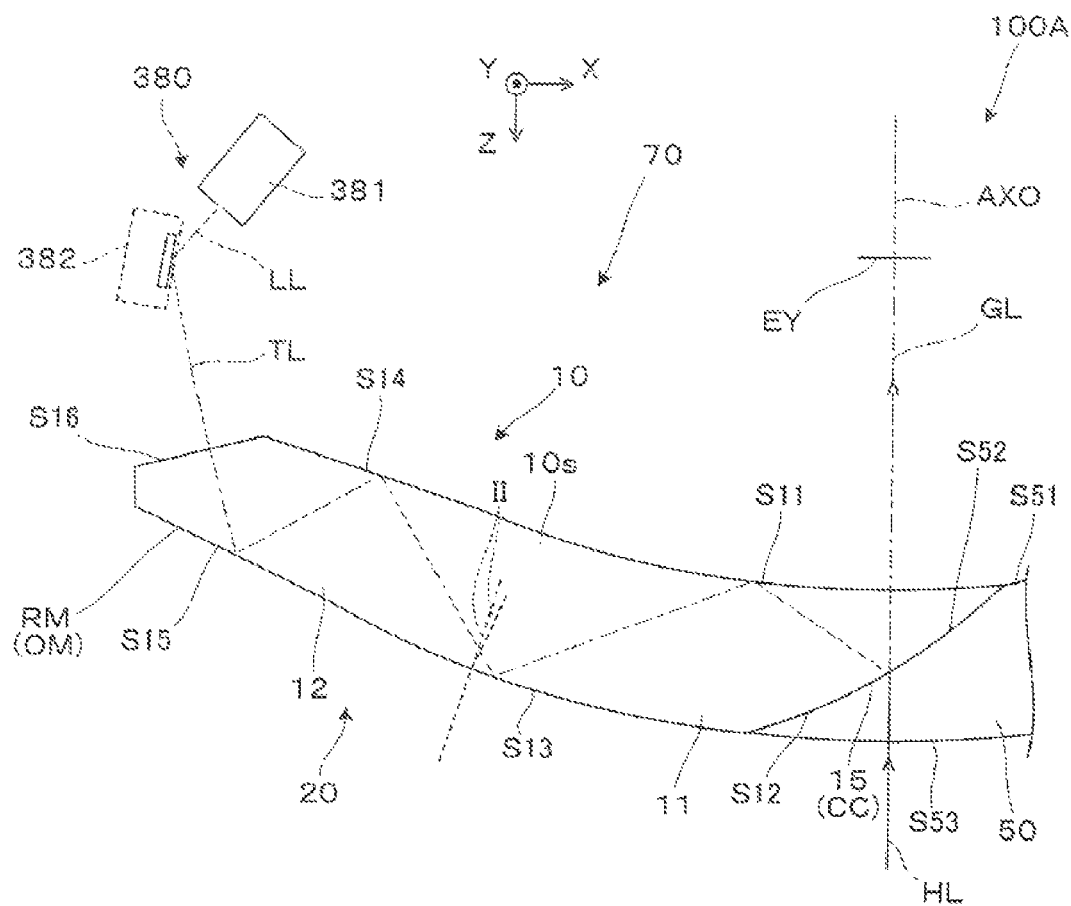
FIG. 10 describes a virtual image display apparatus according to a variation.

A description will be made of the operation of the first display unit 100A shown in FIG. 10. The image display device 380 outputs the signal light LL in the form of the scan light TL toward the sixth surface S16 of the light guide device 20, as described above. The light guide device 20 guides the scan light TL having passed through the sixth surface S16 through the light guide device 20 based, for example, on total reflection and causes the scan light TL to reach the half-silvered mirror layer 15. In this process, when the half-silvered mirror layer 15 is scanned with the scan light TL, a virtual image is formed by the image light GL in the form of the trajectory of the scan light TL, and the wearer's eye EY captures the virtual image for image recognition. In FIG. 10, the sixth surface S16 or a light incident surface of the light guide device 20 is a flat surface perpendicular to the optical axis of the scan light TL. Further, each of the fifth surface S15 and the fourth surface S14 is a flat surface.

The above description has been made of the virtual image display apparatus 100 including a pair of display units 100A and 100B, and the pair of display units 100A and 100B can be replaced with a single display unit. That is, instead of providing each of the right and left eyes with a set of the projection and see-through device 70 and the image display device 80, only one of the right and left eyes may be provided with the projection and see-through device 70 and the image display device 80 for monocular image observation. In this case, the frame 102 and the sidepiece portions 104 can be so shaped that they are horizontally symmetric as shown, for example, in FIGS. 1A and 1B, or a frame portion that supports no display unit can be so shaped differently that the frame portion is fixed to a face portion other than the ear.

In the above description, the distance between the pair of display units 100A and 100B in the X direction has not been described. The distance between the display units 100A and 100B is not necessarily fixed and can be adjusted, for example, by using a mechanical mechanism. That is, when the frame 102 is provided, for example, with an expansion/contraction mechanism, the distance between the display units 100A and 100B in the X direction can be adjusted in accordance with the interpupillary distance of the wearer and other factors.

In the above description, each of the first surface S11 and the third surface S13 of the light guide prism 10 does not have a mirror, a half-silvered mirror, or any other optical component formed thereon but the interface between the surface and air totally reflects and guides video image light. The total reflection in the virtual image display apparatus 100 according to the embodiment of the invention also includes reflection based on a mirror coating or a half-silvered mirror film formed on the entirety or part of the first surface S11 or the third surface S13. For example, the total reflection in the embodiment of the invention includes a case where substantially the entire video image light is reflected off a mirror coating or any other optical component provided on the entirety or part of the first surface S11 or the third surface S13 described above provided that the angle of incident of the video image light satisfies the total reflection condition. Further, the entirety or part of the first surface S11 or the third surface S13 may be coated with a mirror having a certain small degree of transmittance provided that sufficiently bright video image light is obtained.

In the above description, the light guide prism 10 and other components extend in the horizontal direction along which the eyes EY are arranged. The light guide prism 10 can alternatively be so disposed that it extends in the vertical direction. In this case, the light guide prism 10 is, for example, supported as a cantilever with an upper portion thereof fixed.

In the above description, the projection lens 30 and the image display device 80 are used to form video image light GL but can be replaced with a scan-type optical system. That is, a MEMS or any other scanner and an LED or any other light source that emits illumination light to be incident on the scanner can be used to form video image light, and the video image light can be guided into the light guide prism 10.

The entire disclosure of Japanese Patent Application No. 2012-252008, filed Nov. 16, 2012 is expressly incorporated by reference herein.

What is claimed is:

1. An optical member comprising:
   a first surface and a second surface which face each other and direct light from a video image device toward a viewer's eye to allow the viewer to visually recognize an image such that a diopter is substantially zero when the viewer observes outside light passing through the first surface and the second surface, the second surface being configured to be closer to the viewer's face than the first surface;
   a sideways end portion provided between the first surface and the second surface;
   a protruding rib provided along at least part of the sideways end portion, and
   an inclined side surface extending between the protruding rib and the second surface, the inclined side surface forming an obtuse angle with respect to the second surface,
   wherein:
      the optical member is produced by bonding a surface of a light guide prism to a surface of an auxiliary prism such that a semi-transmissive reflection layer is disposed at a boundary between the surface of the light guide prism and the surface of the auxiliary prism, and
      the protruding rib extends from the light guide prism to the auxiliary prism so as to extend across the boundary between the surface of the light guide prism and the surface of the auxiliary prism.

2. The optical member according to claim 1, wherein the first and second surfaces reflect video images from the video image device and guide the video images to the viewer's eye.

3. The optical member according to claim 2, wherein each of the first and second surfaces is formed as a surface of a prism-shaped member and guides video image light from a video image display device that is the video image device to the viewer's eye while reflecting the video image light in the prism-shaped member.

4. The optical member according to claim 1, wherein the protruding rib has an attachment portion that allows the first and second surfaces to be attached to a support frame that is a first another member with the first and second surfaces positioned relative to the support frame.

5. The optical member according to claim 4, wherein the attachment portion has a flat surface portion that comes into contact with a stopper surface provided on the frame when the first and second surfaces are attached to the frame and hence serves as a reference for fixing a relative attitude of the first and second surfaces.

6. The optical member according to claim 5, wherein each of the first surface and the second surface is formed of a free-form surface; and
wherein the attachment portion is disposed outside an eye cover including one of the free-form surfaces, having an oval contour, and disposed in front of the eye.

7. The optical member according to claim 1, wherein the protruding rib, which is attached to a frame, limits displacement of the first and second surfaces relative to another member.

8. The optical member according to claim 1, wherein the light guide prism is a main body that guides video image light and allows outside light to be recognized in see-through observation, and
the auxiliary prism is integrally fixed to the light guide prism and assists the see-through observation capability of the light guide prism.

9. The optical member according to claim 1, wherein the semi-transmissive reflection layer includes a half-silvered mirror layer.

10. The optical member according to claim 1, wherein the light guide prism has a first bonding rib as part of the protruding rib,
the auxiliary prism has a second bonding rib as part of the protruding rib, and
the light guide prism and the auxiliary prism are bonded to each other by using the first bonding rib and the second bonding rib as a reference.

11. The optical member according to claim 1, wherein the light guide prism is formed in an injection molding process.

12. The optical member according to claim 11, wherein the protruding rib has a flat plate section extending along the sideways end portion, and the flat plate section is formed along a parting line of a molding die used in the injection molding process.

13. The optical member according to claim 12, wherein the protruding rib has a gate portion associated with the flat plate section and corresponding to a port through which a resin used in the injection molding process flows in.

14. The optical member according to claim 12, further comprising
a connecting surface disposed between the first surface and the flat plate section and inclined to a plane perpendicular to the flat plate section.

15. The optical member according to claim 1, wherein a tapered surface that includes the inclined side surface and extends along the face of the wearer who wears the optical member is provided between the first surface and the second surface.

16. The optical member according to claim 15, wherein the tapered surface has three flat surface portions corresponding to an upper edge of the eye socket, the cheek, and the nose.

17. The optical member according to claim 1, wherein a connecting portion is provided to connect the optical member to an image formation main body portion that is a second another member provided on the side where the video image light is incident, and the connecting portion allows relative alignment of the first and second surfaces with the second another member.

18. The optical member according to claim 17, wherein the connecting portion is a fitting portion that fits into the image formation main body portion to allow alignment of the attitude of the optical member with the image formation main body portion.

19. A virtual image display apparatus comprising:
a video image device that produces video image light; and
the optical member according to claim 1, which directs the video image light from the video image device toward a viewer's eye to allow the viewer to visually recognize an image.

20. The virtual image display apparatus according to claim 19, further comprising
a frame that supports the video image device and the optical member in such a way that the optical member is disposed in front of the viewer's eye.

* * * * *